United States Patent
Takano et al.

(10) Patent No.: US 9,428,235 B2
(45) Date of Patent: Aug. 30, 2016

(54) VEHICLE

(71) Applicant: YAMAHA HATSUDOKI KABUSHIKI KAISHA, Iwata-shi, Shizuoka (JP)

(72) Inventors: Kazuhisa Takano, Shizuoka (JP); Toshio Iizuka, Shizuoka (JP); Hirotoshi Noguchi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/901,379

(22) PCT Filed: Jun. 30, 2014

(86) PCT No.: PCT/JP2014/067485
§ 371 (c)(1),
(2) Date: Dec. 28, 2015

(87) PCT Pub. No.: WO2015/002172
PCT Pub. Date: Jan. 8, 2015

(65) Prior Publication Data
US 2016/0152292 A1  Jun. 2, 2016

(30) Foreign Application Priority Data
Jul. 1, 2013  (JP) ................. 2013-138488

(51) Int. Cl.
B60G 21/00 (2006.01)
B62K 5/10 (2013.01)
(Continued)

(52) U.S. Cl.
CPC .. *B62K 5/10* (2013.01); *B62J 6/02* (2013.01); *B62K 5/027* (2013.01); *B62K 5/05* (2013.01); *B62K 5/08* (2013.01); *B62L 1/00* (2013.01); *B62K 2005/001* (2013.01)

(58) Field of Classification Search
CPC .......... B62K 5/00; B62K 5/027; B62K 5/05; B62K 5/08; B62K 5/10; B62K 25/08
USPC .............. 280/5.509, 93.502, 93.508, 93.511, 280/124.103
See application file for complete search history.

(56) References Cited

U.S. PATENT DOCUMENTS

| 7,073,806 B2 * | 7/2006 | Bagnoli ................... B62K 5/05 180/210 |
| D547,242 S | 7/2007 | Lambri |

(Continued)

FOREIGN PATENT DOCUMENTS

| CN | 103153769 A | 6/2013 |
| EP | 2 204 312 A1 | 7/2010 |

(Continued)

OTHER PUBLICATIONS

Official Communication issued in International Application PCT/JP2014/067485, mailed on Sep. 16, 2014.

(Continued)

*Primary Examiner* — Toan To
(74) *Attorney, Agent, or Firm* — Keating and Bennett, LLP

(57) ABSTRACT

A vehicle includes a front end of a front portion and at least a portion of a headlamp disposed on the left of a right end of a right front wheel and on the right of a left end of a left front wheel when the vehicle is in the upright state, above upper ends of the right front wheel and the left front wheel, and below an upper end of a lower cross portion in relation to an up-and-down direction of a body frame in a position located ahead of a front end of the lower cross portion when looking at the vehicle from a side thereof.

16 Claims, 10 Drawing Sheets

(51) Int. Cl.
  *B62K 5/08* (2006.01)
  *B62J 6/02* (2006.01)
  *B62K 5/027* (2013.01)
  *B62K 5/05* (2013.01)
  *B62L 1/00* (2006.01)
  *B62K 5/00* (2013.01)

(56) References Cited

U.S. PATENT DOCUMENTS

| | | | |
|---|---|---|---|
| 9,216,790 B2 * | 12/2015 | Takano | B60G 17/005 |
| 9,238,494 B2 * | 1/2016 | Iizuka | B62K 5/027 |
| 9,278,711 B2 * | 3/2016 | Takano | B62K 5/05 |
| 9,296,420 B2 * | 3/2016 | Sasaki | B62J 15/00 |
| 2010/0044977 A1 * | 2/2010 | Hughes | B60G 21/007 280/5.509 |
| 2010/0168966 A1 | 7/2010 | Tsujii et al. | |
| 2013/0168944 A1 | 7/2013 | Bartolozzi et al. | |
| 2014/0353940 A1 | 12/2014 | Bartolozzi et al. | |
| 2014/0375015 A1 * | 12/2014 | Yu | B62K 5/027 280/267 |

FOREIGN PATENT DOCUMENTS

| | | |
|---|---|---|
| EP | 2 216 218 A1 | 8/2010 |
| EP | 2 923 931 A1 | 9/2015 |
| JP | 2010-155486 A | 7/2010 |
| JP | 2010-228551 A | 10/2010 |
| JP | 2012-56503 A | 3/2012 |
| JP | 2013-103693 A | 5/2013 |
| WO | 2012/007819 A1 | 1/2012 |

OTHER PUBLICATIONS

Sasaki; "Vehicle"; U.S. Appl. No. 14/901,382; filed Dec. 28, 2015.

* cited by examiner

VEHICLE

BACKGROUND OF THE INVENTION

1. Field of the Invention

The present invention relates to a vehicle that includes a body frame that leans and two front wheels.

2. Description of the Related Art

There is known a vehicle that includes a body frame that leans to the right when the vehicle turns right and leans to the left when the vehicle turns left and two front wheels (for example, refer to U.S. Design Pat. No. 547,242 and Catalogo partidi ricambio, MP3 300ie LT Mod. ZAPM64102, Piaggio).

The vehicles disclosed in U.S. Design Pat. No. 547,242 and Catalogo partidi ricambio, MP3 300ie LT Mod. ZAPM64102, Piaggio that include the body frame that leans and the two front wheels include a link mechanism including an upper cross portion and a lower cross portion and a headlamp. An outline of a front portion of the vehicles includes, at least, a body cover that covers at least a portion of the link mechanism and the headlamp.

In the vehicles disclosed in U.S. Design Pat. No. 547,242 and Catalogo partidi ricambio, MP3 300ie LT Mod. ZAPM64102, Piaggio that include the body frame that leans and the two front wheels, a front end of the lower cross portion of the link mechanism is disposed ahead of the upper cross portion thereof. Because of this, a space is provided in front of the upper cross portion where no member of the link mechanism passes even in the event that the link mechanism is activated to operate.

In the vehicles disclosed in U.S. Design Pat. No. 547,242 and Catalogo partidi ricambio, MP3 300ie LT Mod. ZAPM64102, Piaggio that include the body frame that leans and the two front wheels, at least a portion of the headlamp is provided inwards of the body cover. The headlamp includes a light source and an outer cover that is provided in a position spaced apart from and to the front of the light source and that is long in the front-and-rear direction. The headlamp that is long in the front-and-rear direction is disposed by using the space defined in front of the upper cross portion. Namely, in U.S. Design Pat. No. 547,242 and Catalogo partidi ricambio, MP3 300ie LT Mod. ZAPM64102, Piaggio, a reduction in the voluminous appearance of the front portion of the vehicle is attempted by making the front portion of the vehicle compact based on the idea that the headlamp is disposed by using the space in front of the upper cross portion which is the dead space.

On the other hand, in general, in case a front edge of the front portion of the vehicle is shaped so that a front end and an upper end thereof are connected smoothly, it is easy to reduce the air resistance. In the vehicles disclosed in U.S. Design Pat. No. 547,242 and Catalogo partidi ricambio, MP3 300ie LT Mod. ZAPM64102, Piaggio that includes the body frame that leans and the two front wheels, a front end of the front portion of the vehicle projects to a location ahead of the front wheels in the side view of the vehicle. This configuration enables the front edge of the front portion of the vehicle to be shaped so that the front end is connected smoothly to the upper end thereof that is disposed above the upper cross portion. In U.S. Design Pat. No. 547,242 and Catalogo partidi ricambio, MP3 300ie LT Mod. ZAPM64102, Piaggio, a reduction in the air resistance is achieved by using the configuration described above.

Incidentally, in the vehicles disclosed in U. S. Design Pat. No. 547,242 and Catalogo partidi ricambio, MP3 300ie LT Mod. ZAPM64102, Piaggio that include the body frame that leans and the two front wheels, as has been described above, the front end of the lower cross portion is disposed ahead of the upper cross portion, and the headlamp that is long in the front-and-rear direction is disposed directly ahead of the upper cross portion. Because of this, a front end of the headlamp and the front end of the lower cross portion are disposed near each other in relation to the front-and-rear direction. Because of this, in a side view of the vehicle, a portion that connects a portion of the front edge of the front portion of the vehicle and that is disposed in an area that is occupied by the headlamp in relation to an up-and-down direction (hereinafter, referred to as a headlamp area front edge portion) with a portion of the front edge of the front portion of the vehicle that is disposed in front of the lower cross portion easily takes a shape that extends perpendicularly, thus increasing the air resistance.

To describe this in greater detail, in the vehicles disclosed in U.S. Design Pat. No. 547,242 and Catalogo partidi ricambio, MP3 300ie LT Mod. ZAPM64102, Piaggio that includes the body frame that leans and the two front wheels, the headlamp that is long in the front-and-rear direction is disposed in front of the upper cross portion that is located near the upper end of the front portion of the vehicle. Because of this, the front edge of the front portion of the vehicle tends to have a bent shape in which an inclination angle relative to a horizontal plane of the portion from the upper end to the headlamp area front edge portion is small, while an inclination angle to a horizontal plane of the portion from the headlamp area front edge portion to the front end is large. Because of this, the air resistance tends to be increased at the portion of the front edge of the front portion of the vehicle that extends from the headlamp area front edge portion to the front end.

In the vehicles disclosed in U.S. Design Pat. No. 547,242 and Catalogo partidi ricambio, MP3 300ie LT Mod. ZAPM64102, Piaggio that include the body frame that leans and the two front wheels, a lower portion of the headlamp area front edge portion is extended to the front of the front wheels, and the front edge of the front portion of the vehicle is positioned directly ahead of the front wheels so that the front edge of the front portion of the vehicle has a rectilinear shape, thus reducing the air resistance. However, as a result of the front end of the front portion of the vehicle being extended to the front of the front wheels, the front portion of the vehicle tends to have a voluminous appearance.

In this manner, as in U.S. Design Pat. No. 547,242 and Catalogo partidi ricambio, MP3 300ie LT Mod. ZAPM64102, Piaggio, combining (a) the idea that the voluminous appearance is reduced by disposing the headlamp in the dead space in front of the upper cross portion and (b) the idea that the front edge of the front portion of the vehicle is shaped so that the front end is connected smoothly to the upper end to reduce the air resistance results in the fact that although the air resistance is reduced, the voluminous appearance is increased.

SUMMARY OF THE INVENTION

Preferred embodiments of the present invention provide a vehicle including a headlamp disposed in an interior of a body cover in which a voluminous appearance is reduced while reducing air resistance.

According to a preferred embodiment of the present invention, a vehicle includes a body frame that leans to a right of the vehicle when the vehicle turns right and that leans to a left of the vehicle when the vehicle turns left; a right front wheel and a left front wheel that are aligned in a left-and-right direction of the body frame; a right suspension device that supports the right front wheel at a lower portion thereof and that absorbs an upward displacement of the right front wheel in an up-and-down direction of the body frame; a left suspension device that supports the left front wheel at a lower portion thereof and that absorbs an upward displacement of the left front wheel in the up-and-down direction of the body frame; a link mechanism which includes a right side portion that supports an upper portion of the right suspension device so as to allow the upper portion to turn about a right steering axis that extends in the up-and-down direction of the body frame, a left side portion that supports an upper portion of the left suspension device so as to allow the upper portion to turn about a left steering axis that is parallel to the right steering axis, an upper cross portion that supports an upper portion of the right side portion at a right end portion thereof so as to allow the upper portion to turn about an upper right axis that extends in a front-and-rear direction of the body frame, supports an upper portion of the left side portion at a left end portion thereof so as to allow the upper portion to turn about an upper left axis that is parallel to the upper right axis, and that is supported on the body frame at a middle portion thereof so as to turn about an upper middle axis that is parallel to the upper right axis and the upper left axis, and a lower cross portion that supports a lower portion of the right side portion at a right end portion so as to allow the upper portion to turn about a lower right axis that is parallel to the upper right axis, supports a lower portion of the left side portion at a left end portion thereof so as to allow the upper portion to turn about a lower left axis that is parallel the upper left axis, and that is supported on the body frame at a middle portion thereof so as to turn about a lower middle axis that is parallel to the upper middle axis; a headlamp that includes a light source that emits light toward a front of the vehicle; and a body cover that covers at least a portion of the headlamp, the upper cross portion and a right side surface, a left side surface, and an upper surface of the lower cross portion; wherein at least a portion of the headlamp is disposed on the left of a right end of the right front wheel and on the right of a left end of the left front wheel when the vehicle is in an upright state and is disposed above upper ends of the right front wheel and the left front wheel and below an upper end of the lower cross portion in relation to the up-and-down direction of the body frame in a location ahead of a front end of the lower cross portion in a side view of the vehicle, and in a front end portion of the vehicle that includes the headlamp and the body cover a front edge of the front portion of the vehicle extends from a front end to above the upper cross portion and to behind the front end of the lower cross portion in the side view of the vehicle when the vehicle is in the upright state, and the front end of the front portion of the vehicle is disposed on the left of the right end of the right front wheel and on the right of the left end of the left front wheel when the vehicle is in the upright state and is disposed above the upper ends of the right front wheel and the left front wheel and below the upper end of the lower cross portion in relation to the up-and-down direction of the body frame in a position ahead of the front end of the lower cross portion in the side view of the vehicle.

The inventors discovered that it is difficult to make the reduction in air resistance compatible with the reduction in voluminous appearance even by combining the idea (a) with the idea (b) as done in U.S. Design Pat. No. 547,242 and Catalogo partidi ricambio, MP3 300ie LT Mod. ZAPM64102, Piaggio. The inventors studied the configuration in which the headlamp that is long in the front-and-rear direction is disposed using the space in front of the lower cross portion and the front end of the front portion of the vehicle and positioned near the headlamp, and conceived of and developed various preferred embodiments of the present invention.

At a glance, in considering U.S. Design Pat. No. 547,242 and Catalogo partidi ricambio, MP3 300ie LT Mod. ZAPM64102, Piaggio, it is necessary that the front portion of the vehicle is enlarged in size in the front-and-rear direction as a result of the headlamp that is long in the front-and-rear direction being disposed in the space directly ahead of the lower cross portion that is ahead of the upper cross portion at the front end thereof. Additionally, in case the front end of the front portion of the vehicle is disposed above the upper ends of the right front wheel and the left front wheel, it is difficult for the front edge of the front portion of the vehicle to have a smooth rectilinear shape and hence to reduce the air resistance.

However, the inventors discovered that the voluminous appearance of the front portion of the vehicle is reduced while reducing the air resistance by configuring the front portion of the vehicle into such a shape that the front end thereof projects downwards and forward by positioning the headlamp below the upper end of the lower cross portion and conceived of and developed various preferred embodiments of the present invention.

According to a preferred embodiment of the present invention, a vehicle includes the body frame that leans and the two front wheels, at least a portion of the headlamp is disposed on the left of the right end of the right front wheel and on the right of the left end of the left front wheel when the vehicle is in the upright state and is disposed above the upper ends of the right front wheel and the left front wheel and below the upper end of the lower cross portion in relation to the up-and-down direction of the body frame in the location ahead of the front end of the lower cross portion in the side view of the vehicle.

In particular, compared with the vehicles disclosed in U.S. Design Pat. No. 547,242 and Catalogo partidi ricambio, MP3 300ie LT Mod. ZAPM64102, Piaggio, the headlamp according to various preferred embodiments of the present invention is provided in a low position that is located below the upper end of the lower cross portion. Since the headlamp is long in the front-and-rear direction, the headlamp area front edge portion of the front edge of the front portion of the vehicle is disposed in the area that is located lower and farther forward.

In a preferred embodiment of the present invention, the front end of the front portion of the vehicle includes the headlamp area front end portion (in which case the front end of the headlamp is disposed in a frontmost position on the front portion of the vehicle), and the front end of the front portion of the vehicle is disposed ahead of the headlamp area front edge portion (in which case a portion of the body cover is disposed ahead of the headlamp).

Additionally, according to a preferred embodiment of the present invention, as to the front portion of the vehicle that includes the headlamp and the body cover, the front edge of the front portion of the vehicle extends from the front end to above the upper cross portion and to behind the front end of the lower cross portion in the side view of the vehicle when the vehicle is in the upright state. Further, the front end of the front portion of the vehicle is disposed on the left of the right end of the right front wheel and on the right of the left end of the left front wheel when the vehicle is in the upright state and is disposed above the upper ends of the right front wheel and the left front wheel and below the upper end of the lower cross portion in relation to the up-and-down direction of the body frame in the location ahead of the front end of the lower cross portion in the side view of the vehicle.

According to a preferred embodiment of the present invention, the front end of the front portion of the vehicle is disposed in the area where at least a portion of the headlamp is disposed and which is located above the upper ends of the right front wheel and the left front wheel and below the upper end of the lower cross portion.

In a preferred embodiment of the present invention, as has been described above, the headlamp area front edge portion of the front edge of the front portion of the vehicle is disposed in the area that is located lower and farther forward in the side view of the vehicle. Further, since the front end of the front portion of the vehicle is disposed at the headlamp area front edge portion or ahead thereof, the front end of the front portion of the vehicle is disposed in the area that is located lower and farther forward. In particular, the front end of the front portion of the vehicle is disposed in a position that is spaced away largely forward and downwards from the upper end of the front portion of the vehicle. Because of this, the front edge of the front portion of the vehicle has a smoothly continuous rectilinear or substantially rectilinear shape from the upper end to the front end of the front portion of the vehicle.

Additionally, since the front end of the front portion of the vehicle is disposed above the upper ends of the right front wheel and the left front wheel, the front portion of the vehicle has a compact shape in the up-and-down direction, so that the voluminous appearance of the front portion of the vehicle is reduced. Further, the front end of the front portion of the vehicle is disposed above the upper ends of the right front wheel and the left front wheel and below the upper end of the lower cross portion in relation to the up-and-down direction of the body frame in the location ahead of the front end of the lower cross portion. In particular, the front portion of the vehicle has a shape in which the front end thereof projects to the front in a low position. Because of this, it is easy for the portion located near the eyes of the user who rides on the vehicle to be small so that the voluminous appearance is easily reduced.

From the reasons described heretofore, there is provided the vehicle including a headlamp disposed in the interior of the body cover in which the voluminous appearance of the front portion of the vehicle is reduced while reducing the air resistance.

In a preferred embodiment of the present invention, the following configuration may be used. A right end and a left end of the front portion of the vehicle are disposed behind the front end of the lower cross portion in the top view of the vehicle when the vehicle is in the upright state.

The front portion of the vehicle has a shape in which the front end projects ahead of the right end and the left end of the front portion of the vehicle in the top view of the vehicle, so that the voluminous appearance of the front portion of the vehicle is reduced while reducing the air resistance.

In a preferred embodiment of the present invention, the following configuration may be used. The right end and the left end of the front portion of the vehicle are disposed behind a front end of the upper cross portion in the top view of the vehicle when the vehicle is in the upright state.

The front portion of the vehicle has a shape in which the front end projects farther ahead of the right end and the left end of the front portion of the vehicle in the top view of the vehicle, so that the voluminous appearance of the front portion of the vehicle is reduced while reducing the air resistance.

In a preferred embodiment of the present invention, the following configuration may be used. The right end and the left end of the front portion of the vehicle are disposed behind a rear end of the lower cross portion in the top view of the vehicle when the vehicle is in the upright state.

The front portion of the vehicle has a shape in which the front end projects farther ahead of the right end and the left end of the front portion of the vehicle in the top view of the vehicle, so that the voluminous appearance of the front portion of the vehicle is reduced while reducing the air resistance.

In a preferred embodiment of the present invention, the following configuration may be used. The right end and the left end of the front portion of the vehicle are disposed behind a rear end of the upper cross portion in the top view of the vehicle when the vehicle is in the upright state.

The front portion of the vehicle has a shape in which the front end projects farther ahead of the right end and the left end of the front portion of the vehicle in the top view of the vehicle, so that the voluminous appearance of the front portion of the vehicle is reduced while reducing the air resistance.

In a preferred embodiment of the present invention, the following configuration may be used. The front end of the front portion of the vehicle is disposed behind front ends of the right front wheel and the left front wheel in the side view of the vehicle when the vehicle is in the upright state.

As has been described above, the front portion of the vehicle is reduced in length in the front-and-rear direction while the front edge of the front portion of the vehicle has a smooth rectilinear or substantially rectilinear shape, so that the voluminous appearance of the front portion of the vehicle is further reduced.

In a preferred embodiment of the present invention, the following configuration may be used. At least a portion of the headlamp is disposed above a lower end of the lower cross portion in relation to the up-and-down direction of the body frame in the side view of the vehicle when the vehicle is in the upright state.

Since at least a portion of the headlamp is disposed above the lower end of the lower cross portion, even in the event that the body frame leans, the headlamp is prevented from interfering with the front wheels. The vehicle includes a headlamp that is prevented from interfering with the front wheels while maintaining a low air resistance and a compact size of the front portion of the vehicle.

In a preferred embodiment of the present invention, the following configuration may be used. At least a portion of the headlamp is disposed ahead of rotating axes of the right front wheel and the left front wheel in the side view of the vehicle when the vehicle is in the upright state.

Since at least a portion of the headlamp is disposed ahead of the rotating axes of the right front wheel and the left front wheel, the portion of the front edge of the front portion of the vehicle which is located directly ahead of the headlamp and the front end which is located ahead of that portion is disposed farther forward. This makes it easy to make the front portion of the vehicle into a shape in which the front end projects farther forward, so that a vehicle is provided in which the air resistance is small and the voluminous appearance of the front portion of the vehicle is small.

In a preferred embodiment of the present invention, the following configuration may be used. At least a portion of an outer cover that covers the light source of the headlamp defines a portion of the front edge of the front portion of the vehicle in the side view of the vehicle.

Since at least a portion of the transparent or translucent outer cover defines a portion of the front edge of the front portion of the vehicle, an impression is imparted that a portion of the front portion of the vehicle is cut out in the side view of the vehicle, thus making it possible to provide the vehicle in which the voluminous appearance of the front portion of the vehicle is reduced further.

In a preferred embodiment of the present invention, the following configuration may be used. The front portion of the vehicle has a shape in which the front portion of the vehicle is tapered from the right end and the left end thereof towards the headlamp in the top view of the vehicle.

The front portion of the vehicle has the shape in which the front portion is tapered as it extends forward (the tapered shape) so that the front end projects ahead of the right end and the left end of the front portion of the vehicle in the top view of the vehicle, so that the voluminous appearance of the front portion of the vehicle is reduced further while reducing the air resistance.

In a preferred embodiment of the present invention, the following configuration may be used. The vehicle includes a brake device that applies a braking force to at least one of the right front wheel and the left front wheel and a fluid unit including a plurality of brake fluid flow paths to control the operation of the brake device by switching the flow paths through which a brake fluid flows, and at least a portion of the fluid unit is aligned with the headlamp along a vertical direction when the vehicle is in the upright state.

The headlamp and the fluid unit are both heavy devices, and since the headlamp and at least a portion of the fluid unit are aligned with each other along the vertical direction, it is easy to balance the weight of the front portion of the vehicle in relation to the left-and-right direction and the front-and-rear direction.

In a preferred embodiment of the present invention, the following configuration may be used. At least a portion of the fluid unit is provided between the headlamp and the upper cross portion in a front view of the vehicle when the vehicle is in the upright state.

Since at least a portion of the fluid unit is disposed above the headlamp, the interference of the fluid unit with the right front wheel and the left front wheel is easily prevented. Additionally, since at least a portion of the fluid unit is disposed below the upper cross portion, the center of gravity of the vehicle is prevented from becoming high. This provides the vehicle including the fluid unit mounted thereon that prevents the center of gravity of the vehicle from becoming high while preventing the interference of the fluid unit with the front wheels.

In a preferred embodiment of the present invention, the following configuration may be used. The front edge of the front portion of the vehicle is shaped so that an inclination angle of a portion that is disposed above the headlamp relative to the horizontal plane is smaller than an inclination angle of a portion that is disposed above the portion above the headlamp relative to the horizontal plane in the side view of the vehicle when the vehicle is in the upright state.

On the front edge of the front portion of the vehicle, since the inclination angle of the portion disposed above the headlamp relative to the horizontal plane is smaller than the inclination angle of the portion disposed above the portion above the headlamp relative to the horizontal plane, the front edge of the front portion of the vehicle is easily shaped so as to project forward in a lower position. This provides a vehicle in which the voluminous appearance of the front portion of the vehicle is reduced so as to reduce the air resistance further.

In a preferred embodiment of the present invention, the following configuration may be used. A vertical distance from the front end of the front portion of the vehicle to the upper end of the lower cross portion is smaller than a vertical distance from the upper end of the lower cross portion to the upper end of the front portion of the vehicle in a front view of the vehicle when the vehicle is in the upright state.

The portion from the front end of the front portion of the vehicle to the upper end of the lower cross portion is disposed below the portion from the upper end of the lower cross portion to the upper end of the front portion of the vehicle in relation to the up-and-down direction. Since the portion from the front end of the front portion of the vehicle to the upper end of the lower cross portion which is disposed at a lower portion of the front portion of the vehicle is small in the vertical direction, the portion of the front portion of the vehicle that projects forward is small, so that the voluminous appearance of the front portion of the vehicle is reduced.

In a preferred embodiment of the present invention, the following configuration may be used. The headlamp includes a right headlamp including an outer cover that defines a portion of a right edge of the front portion of the vehicle and a left headlamp including an outer cover that defines a portion of a left edge of the front portion of the vehicle, and wherein the front end of the front portion of the vehicle is disposed between the outer cover of the right headlamp and the outer cover of the left headlamp in the top view of the vehicle.

The front portion of the vehicle has the shape in which the front end projects ahead of the right end and the left end of the front portion of the vehicle in the top view of the vehicle, so that the voluminous appearance of the front portion of the vehicle is reduced further while reducing the air resistance.

In a preferred embodiment of the present invention, the following configuration may be used. The vehicle includes a brake device that applies a braking force to at least one of the right front wheel and the left front wheel and a fluid unit including a plurality of brake fluid flow paths to control the operation of the brake device by switching the flow paths through which a brake fluid flows, and at least a portion of the fluid unit is disposed between the right headlamp and the left headlamp in the top view of the vehicle when the vehicle is in the upright state.

In relation to the fluid unit, the right headlamp and the left headlamp which are all heavy devices, since at least a portion of the fluid unit is disposed between the right headlamp and the left headlamp, the weight of the front portion of the vehicle is easily balanced in relation to the left-and-right direction.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Hereinafter, referring to the accompanying drawings, a first preferred embodiment of a vehicle according to the present invention will be described.

In the first preferred embodiment, a vehicle including two front wheels and one rear wheel will be described as an example of the vehicle.

Figure 1:
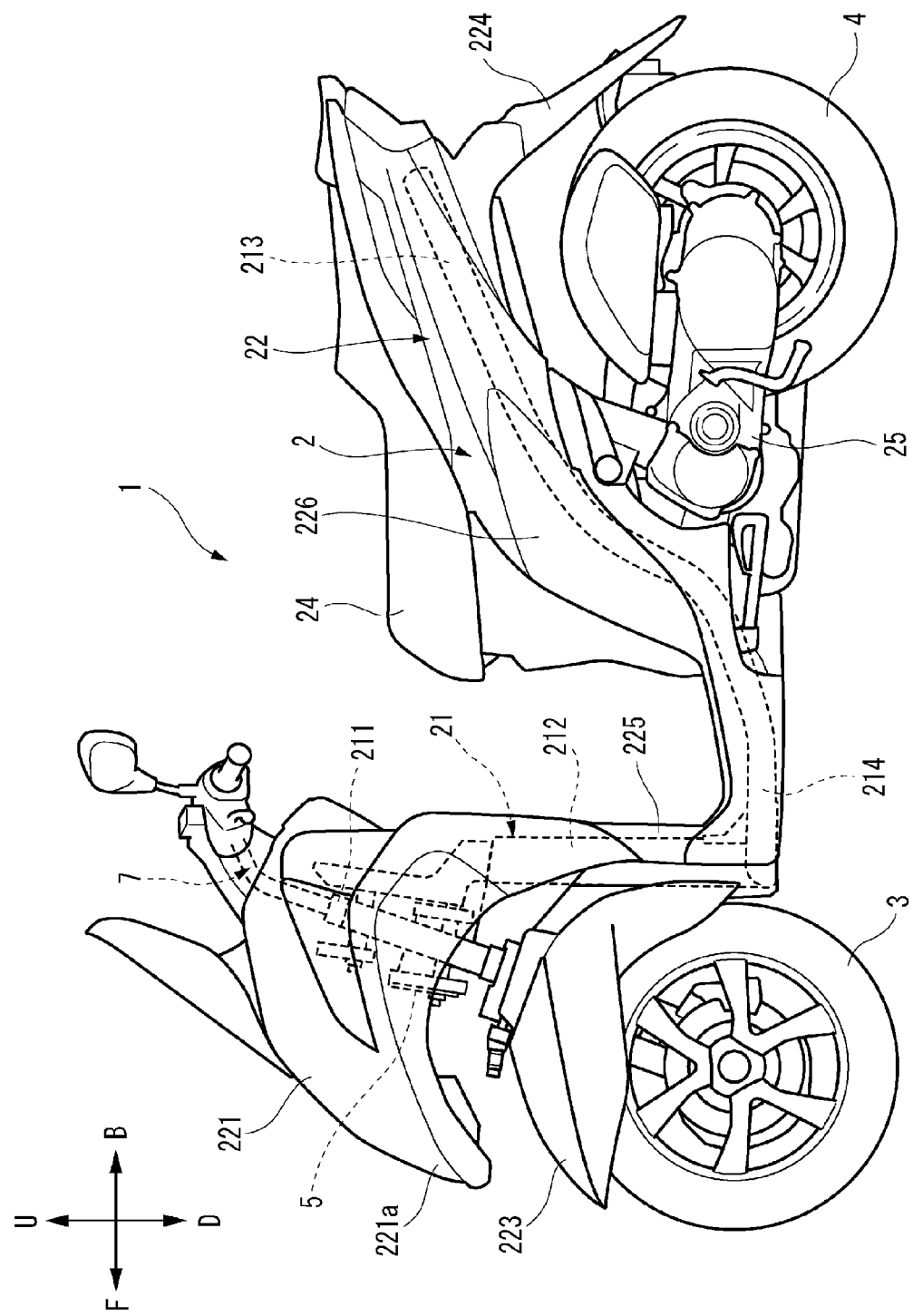
FIG. 1 is an overall side view of a vehicle according to a first preferred embodiment of the present invention.

FIG. 1 is a side view of the whole of a vehicle 1 as viewed from the left thereof. Hereinafter, in the drawings, an arrow F denotes a forward direction of the vehicle 1 and an arrow B denotes a rearward direction of the vehicle 1. An arrow U denotes an upward direction of the vehicle 1 and an arrow D denotes a downward direction of the vehicle 1. When forward, rearward, leftward, and rightward directions are referred to in the following description, they mean forward, rearward, leftward, and rightward directions as seen from a rider of the vehicle 1. An up-and-down direction means a vertical direction and also a substantially up-and-down direction which inclines from the vertical direction. A left-and-right direction means a horizontal direction and also a substantially left-and-right direction which inclines from the horizontal direction. A center in a vehicle's width direction means a central position of the vehicle 1 in the vehicle's width direction. The right in the vehicle's width direction means a direction directed from the center in the vehicle's width direction towards the right. The left in the vehicle's width direction means a direction directed from the center in the vehicle's width direction towards the left. An unloaded state of the vehicle means a state in which the vehicle 1 is in the upright state with front wheels neither steered nor caused to lean when no rider rides on and no fuel is put in the vehicle 1.

As shown in FIG. 1, the vehicle 1 includes a vehicle main body portion 2, a pair of left and right front wheels 3 (refer to FIG. 2), a rear wheel 4, a steering mechanism 7, and a link mechanism 5. The vehicle main body portion 2 includes a body frame 21, a body cover 22, a seat 24, and a power unit 25.

The body frame 21 includes a headstock 211, a down frame 212, an under frame 214, and a rear frame 213. In FIG. 1, in the body frame 21, portions that are hidden by the body cover 22 are shown by broken lines. The body frame 21 supports the power unit 25, the seat 24 and the like. The power unit 25 includes a drive source such as an engine, an electric motor or the like, a transmission and the like.

The head pipe 211 is disposed at a front portion of the vehicle 1. The headstock 211 is slanted with respect to the vertical direction so that, in a side view of the vehicle 1, an upper portion thereof is positioned behind the lower portion thereof. The steering mechanism 7 and the link mechanism 5 are disposed around the headstock 211. A steering shaft 60 of the steering mechanism 7 is turnably inserted into the head pipe 211. The headstock 211 supports the link mechanism 5.

The headstock 211 is a portion of the body frame 21 and leans to the right of the vehicle 1 when the vehicle 1 turns right and leans to the left of the vehicle 1 when the vehicle 1 turns left.

The down frame 212 is connected to the headstock 211. The down frame 212 is disposed behind the headstock 211 and extends along the up-and-down direction. The under frame 214 is connected to a lower portion of the down frame 212. The under frame 214 extends rearwards from the lower portion of the down frame 212. The rear frame 213 is disposed behind the under frame 214 and extends rearwards and upwards. The rear frame 213 supports the seat 24, the power unit 25, a tail lamp and the like.

The body frame 21 is covered by the body cover 22. The body cover 22 includes a front cover 221, a pair of left and right mudguards 223, a leg shield 225, a center cover 226, and a rear mudguard 224.

The front cover 221 is arranged directly ahead of the seat 24. The front cover 221 covers at least a portion of the steering mechanism 7 and the link mechanism 5. The front cover 221 includes a front portion 221a that is disposed ahead of the link mechanism 5. In the side view of the vehicle 1 in the unloaded state, the front portion 221a of the front cover 221 is disposed behind front ends of the front wheels 3. In the side view of the vehicle 1 in the unloaded state, the front portion 221a of the front cover 221 is disposed behind front ends of the front wheels 3. The leg shield 225 is disposed below the front cover 221 and ahead of the seat 24. The center cover 226 is disposed so as to cover the circumference of the rear frame 213.

The pair of left and right front mudguards 223 (see FIG. 2) is disposed directly below the front cover 221 and directly above the pair of front wheels 3. The rear mudguard 224 is disposed directly above a rear portion of the rear wheel 4.

The pair of left and right front wheels 3 is disposed below the headstock 211 and directly below the front cover 221 when the vehicle 1 is unloaded. The rear wheel 4 is disposed below the center cover 226 and the rear mudguard 224.

Figure 2:
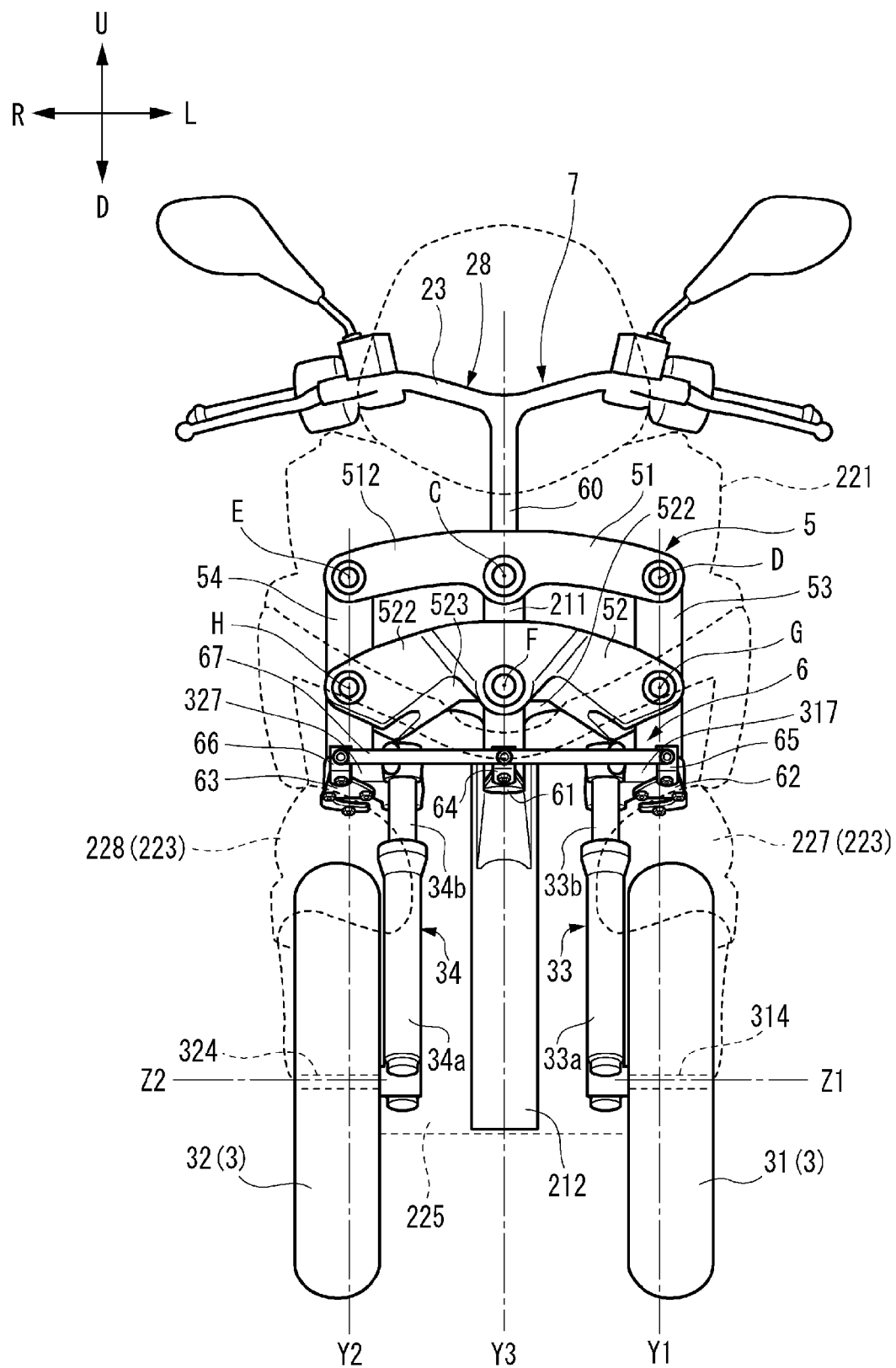
FIG. 2 is a front view of a front portion of the vehicle shown in FIG. 1.
Figure 3:
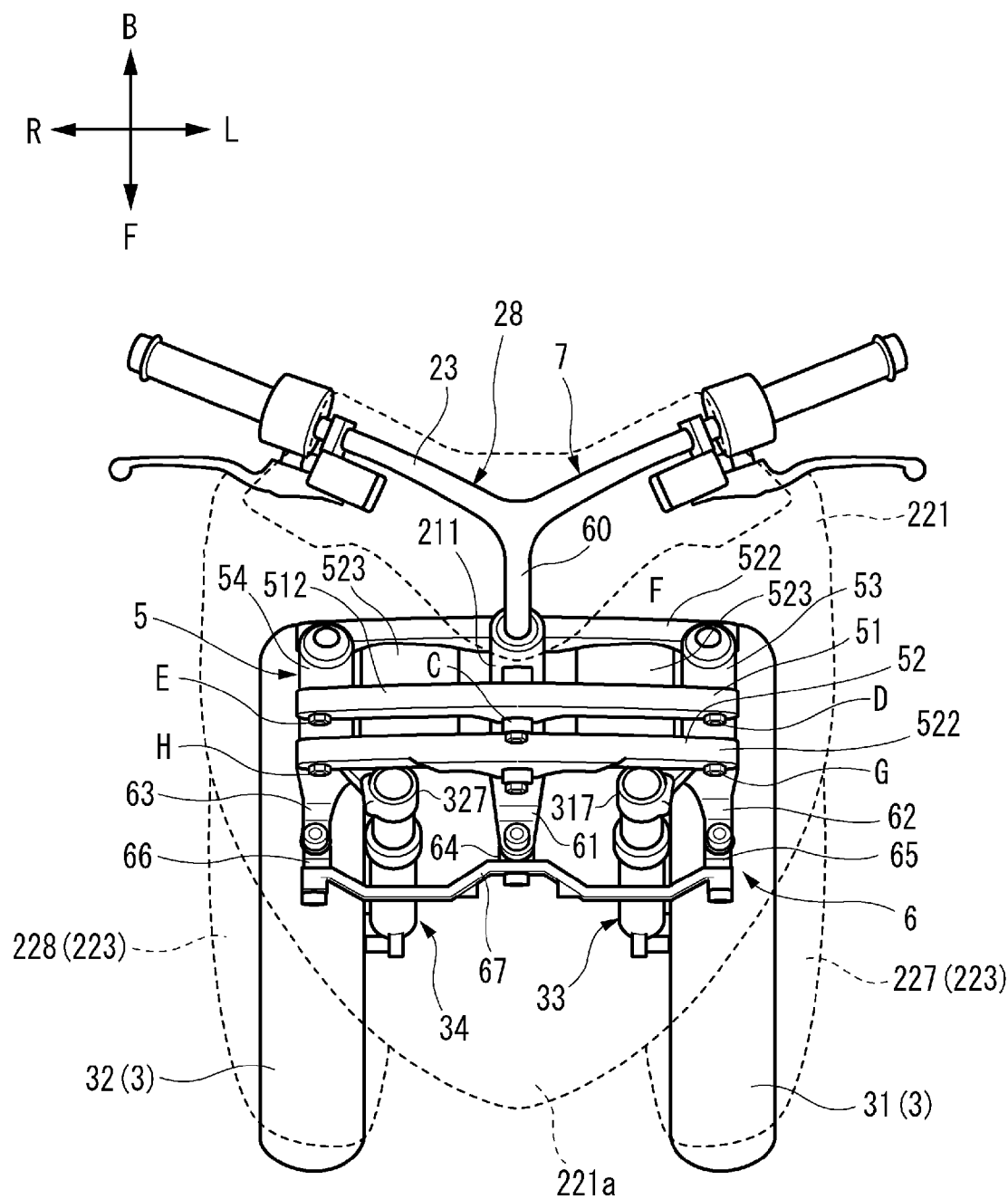
FIG. 3 is a plan view of the front portion of the vehicle shown in FIG. 1.

FIG. 2 is a front view of the vehicle 1 shown in FIG. 1 which results when a front portion of the vehicle 1 is seen from the front thereof. FIG. 3 is a plan view of the vehicle 1 shown in FIG. 1 which results when the front portion of the vehicle 1 is seen from thereabove. FIGS. 2 and 3 show the vehicle 1 as seen through the body cover 22.

As shown in FIGS. 2 and 3, the steering mechanism 7 includes a steering force transmission mechanism 6, a left shock absorber 33, a right shock absorber 34, and a pair of left and right front wheels 3.

The pair of left and right front wheels 3 includes a left front wheel 31 and a right front wheel 32. The left front wheel 31 and the right front wheel 32 are aligned in the left-and-right direction of the body frame 21. The left front wheel 31 and the right front wheel 32 are disposed laterally symmetrical with each other with respect to a center of the vehicle 1 in relation to the vehicle's width direction.

In addition, of the pair of left and right front mudguards 223, a left front mudguard 227 is disposed above the left front wheel 31. Of the pair of left and right front mud guards 223, a right front mud guard 228 is disposed above the right front wheel 32. The left front wheel 31 is supported on the left shock absorber 33. The right front wheel 32 is supported on the right shock absorber 34.

Figure 5:
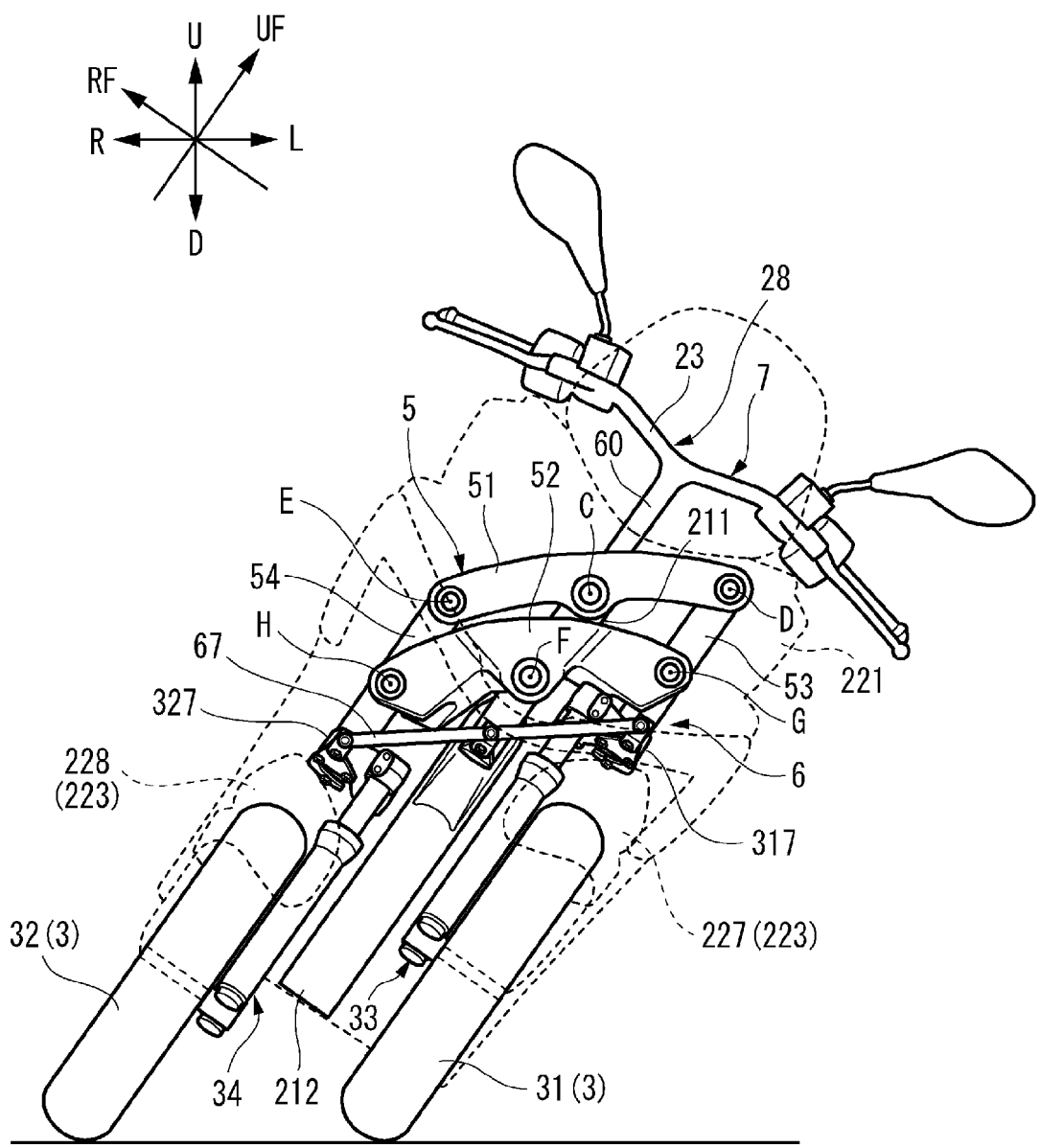
FIG. 5 is a front view of the front portion of the vehicle in a state where the vehicle shown in FIG. 1 is caused to lean.

In this description, the "left-and-right direction of the body frame 21" denotes a direction that intersects at right angles or perpendicular or substantially perpendicular to an axial direction of the headstock 211 in a front view of the vehicle 1. An up-and-down direction of the body frame 21 denotes a direction which extends in an axial direction of the headstock 211 in the front view of the vehicle 1. For example, the up-and-down direction of the body frame 21 coincides with the axial direction of the headstock 211 in the front view of the vehicle 1. As shown in FIG. 2, when the vehicle 1 is in an upright state, a rightward direction RF of the body frame 21 coincides with a rightward direction R in a horizontal direction when the vehicle 1 is viewed front the front thereof. Because of this, only the rightward direction R in the horizontal direction is shown in FIG. 2. As shown in FIG. 5, when the vehicle 1 leans relative to a road surface, in the front view of the vehicle 1, the rightward direction RF of the body frame 21 does not coincide with the rightward direction R in the horizontal direction, and an upward direction UF of the body frame 21 does not coincide with an upward direction U in the vertical direction.

The left shock absorber (an example of a left suspension device) 33 is preferably a so-called telescopic shock absorber and absorbs vibrations from a road surface. The left shock absorber 33 supports the left front wheel 31 at a lower portion thereof and absorbs an upward displacement of the left front wheel 31 in the up-and-down direction of the body frame 21. The left shock absorber 33 includes a first lower-side portion 33a and a first upper-side portion 33b. The left front wheel 31 is supported on the first lower-side portion 33a. The first lower-side portion 33a extends in the up-and-down direction, and a left wheel axle 314 is supported on a lower end side of the first lower-side portion 33a. The left wheel axle 314 supports the left front wheel 31. The left axle shaft 314 extends along a rotating axis Z1 of the left front wheel 31.

The first upper-side portion 33b is disposed at an upper side of the first lower-side portion 33a when the first upper-side portion 33b is partially inserted into the first lower-side portion 33a. The first upper-side portion 33b moves relative to the first lower-side portion 33a in a direction in which the first lower-side portion 33a extends. An upper portion of the first upper-side portion 33b is fixed to a first bracket 317. In this manner, the left shock absorber 33 supports the left front wheel 31 so as to allow it to be displaced in the up-and-down direction.

The first lower-side portion 33a and the first upper-side portion 33b define two telescopic elements that are aligned parallel in the front-and-rear direction and are connected together. This configuration prevents the first upper-side portion 33b from turning relative to the first lower-side portion 33a.

The right shock absorber (an example of a right suspension device) 34 is preferably a so-called telescopic shock absorber and absorbs vibrations from the road surface. The right shock absorber 34 supports the right front wheel 32 at a lower portion thereof and absorbs an upward displacement of the right front wheel 32 in the up-to-down direction of the body frame 21. The right shock absorber 34 includes a second lower portion 34a and a second upper portion 34b. The right front wheel 32 is supported on the second lower-side portion 34a. The second lower-side portion 34a extends in the up-and-down direction, and a right wheel axle 324 is supported on a lower end side of the second lower-side portion 34a. The right wheel axle 324 supports the right front wheel 32. The right axle shaft 324 extends along a rotating axis Z2 of the right front wheel 32.

The second upper-side portion 34b is disposed at an upper side of the second lower-side portion 34a when the second upper-side portion 34b is partially inserted into the second lower-side portion 34a. The second upper-side portion 34b moves relative to the second lower-side portion 34a in a direction in which the second lower-side portion 34a extends. An upper portion of the second upper-side portion 34b is fixed to a second bracket 327. In this manner, the right shock absorber 34 supports the right front wheel 32 so as to allow it to be displaced in the up-and-down direction.

The second lower-side portion 34a and the second upper-side portion 34b define two telescopic elements that are aligned parallel in the front-and-rear direction and are connected together. This structure prevents the second upper-side portion 34b from turning relative to the second lower-side portion 34a.

The steering force transmission mechanism 6 is disposed above the left front wheel 31 and the right front wheel 32. The steering force transmission mechanism 6 includes a steering member 28 that inputs a steering force exerted by a rider. The steering member 28 includes a steering shaft 60 and a handlebar 23 that is connected to an upper portion of the steering shaft 60.

The steering shaft 60 is supported on the headstock 211 between the left shock absorber 33 and the right shock absorber 34 in the left-and-right direction of the body frame 21. Additionally, the steering shaft 60 turns about a middle steering axis Y3 that extends in the up-and-down direction of the body frame 21. The steering shaft 60 is disposed so as to extend substantially in the up-and-down direction with a portion thereof inserted into the headstock 211 and turns relative to the headstock 211. The steering shaft 60 is turned as the rider turns the handlebar 23.

The steering force transmission mechanism 6 turns the left shock absorber 33 about a left steering axis Y1 that extends in the up-and-down direction and turns the right shock absorber 34 about a right steering axis Y2 that is parallel to the left steering axis Y1 in association with the turning of the steering shaft 60 which is triggered in response to the operation of the handlebar 23.

The steering effort transmission mechanism 6 includes, in addition to the steering member 28, a first transmission plate 61, a second transmission plate 62, a third transmission plate 63, a first joint 64, a second joint 65, a third joint 66, a tie-rod 67, the first bracket 317, and the second bracket 327. The steering effort transmission mechanism 6 transmits the steering effort by which the rider operates the handlebar 23 to the first bracket 317 and the second bracket 327 by way of those members.

The first transmission plate 61 is disposed at the center in the vehicle's width direction and is connected to the steering shaft 60 so as not to turn relative to the steering shaft 60. The first transmission plate 61 turns as the steering shaft 60 turns.

The second transmission plate 62 is connected to a left side portion 53 of the link mechanism 5, which will be described below, so as to turn relatively. The second transmission plate 62 is fixed to the first bracket 317. The second transmission plate 62 is disposed below the first bracket 317. The second transmission plate 62 is disposed on the left of the first transmission plate 61.

The third transmission plate 63 is connected to a right side portion 54 of the link mechanism 5, which will be described below, so as to turn relatively. The third transmission plate 63 is disposed laterally symmetrical with the second transmission plate 62 around the first transmission plate 61. The third transmission plate 63 is fixed to the second bracket 327. The third transmission plate 63 is positioned below the second bracket 327.

The first joint 64 is disposed at a front portion of the first transmission plate 61. The first joint 64 is supported by a turning shaft that extends in the up-and-down direction so as to turn relative to the first transmission plate 61. The second joint 65 is disposed at a front portion of the second transmission plate 62. The second joint 65 is supported by a turning shaft that extends in the up-and-down direction so as to turn relative to the second transmission plate 62. The third joint 66 is disposed at a front portion of the third transmission plate 63. The third joint 66 is supported by a turning shaft that extends in the up-and-down direction so as to turn relative to the third transmission plate 63. The first joint 64, the second joint 65, and the third joint 66 each include a shaft portion that extends in the front-and-rear diction at a front portion thereof.

The tie-rod 67 is disposed so as to extend in the vehicle's width direction. The tie-rod 67 is supported so as to turn about the shaft portions that extend in the front-and-rear direction at the front portion of the first joint 64, the front portion of the second joint 65, and the front portion of the third joint 66. This tie-rod 67 is a portion of the steering force transmission mechanism 6 and moves so as to maintain a parallel relationship with the lower cross portion 52, which will be described below, when the body frame 21 leans.

The steering effort transmission mechanism 6 that is configured in the manner described above transmits the steering effort transmitted from the steering member 28 to the tie rod 67 by way of the first transmission plate 61 and the first joint 64. This causes the tie rod 67 to be displaced either leftwards or rightwards. The steering force transmitted to the tie-rod 67 is transmitted from the tie-rod 67 to the first bracket 317 via the second transmission plate 62 and the second joint 65 and is transmitted from the tie-rod 67 to the second bracket 327 via the third transmission plate 63 and the third joint 66. As a result, the first bracket 317 and the second bracket 327 turn in the direction in which the tie-rod 67 is displaced.

In this preferred embodiment, the link mechanisms preferably uses a four-joint or four-bar linkage (also, referred to as a parallelogram linkage).

The link mechanism 5 is disposed below the handlebar 23. The link mechanism 5 is connected to the head pipe 211 of the body frame 21. The link mechanism 5 includes an upper cross portion 51, a lower cross portion 52, a left side portion 53, and a right side portion 54 as a configuration by which the vehicle 1 is caused to lean. Additionally, the link mechanism 5 includes the first bracket 317 and the left shock absorber 33 as a configuration that is connected to a lower portion of the left side portion 53 to lean together with the left side portion 53. Further, the link mechanism 5 includes the second bracket 327 and the right shock absorber 34 as a configuration that is connected to a lower portion of the right side portion 54 to lean together with the right side portion 54.

The right side portion 54 supports an upper portion of the right shock absorber 34 so as to turn about a right steering axis Y2 that extends in the up-and-down direction of the body frame 21. The left side portion 53 supports an upper portion of the left shock absorber 33 so as to turn a left steering axis Y1 that is parallel to the right steering axis Y2.

The upper cross portion 51 supports the upper portion of the right side portion 54 at the right end portion thereof so as to turn around an upper right axis E extending in the front-and-rear direction of the body frame 21, supports the upper portion of the left side portion 53 at the left end portion thereof so as to turn around an upper left axis D which is parallel to the upper right axis E, and the middle portion thereof is supported on the body frame 21 so as to turn around an upper middle axis C which is parallel to the upper right axis E and the upper left axis D.

The lower cross portion 52 supports the lower portion of the right side portion 54 at the right end portion thereof so as to turn around a lower right axis H which is parallel to the upper right axis E, supports the lower portion of the left side portion 53 at the left end portion thereof so as to turn around a lower left axis G which is parallel to the upper left axis E, and the middle portion thereof is supported on the body frame 21 so as to turn around a lower middle axis F which is parallel to the upper middle axis C.

The upper cross portion 51 includes a plate-shaped member 512 that is disposed at a front side of the headstock 211 so as to extend in the vehicle width direction. The plate-shaped member 512 is supported on the headstock 211 by a supporting portion that is positioned at a center in the left-and-right direction and turns about an upper middle axis C that extends substantially in the front-and-rear direction relative to the headstock 211.

A left end of the upper cross portion 51 is connected to the left side portion 53 by a supporting portion. The upper cross portion 51 turns relative to the left side portion 53 about the upper left axis D that extends substantially in the front-and-rear direction. The right end of the upper cross portion 51 is connected to the right side portion 54 via the connecting portion E. The upper cross portion 51 turns relative to the right side portion 54 about the upper right axis E that extends substantially in the front-and-rear direction.

The lower cross portion 52 is supported on the headstock 211 by a supporting portion and turns about the lower middle axis F that extends substantially in the front-and-rear direction. The lower cross portion 52 is disposed below the upper cross portion 51. The lower cross portion 52 has substantially the same widthwise length as that of the upper cross portion 51 in relation to the vehicle's width direction and is disposed parallel to the upper cross portion 51.

The lower cross portion 52 includes a pair of plate-shaped members 522, 522 that extend in the vehicle's width direction. The pair of plate-shaped members 522, 522 is disposed so as to hold the headstock 211 therebetween in the front-and-rear direction. The pair of plate-shaped members 522, 522 is connected integrally to each other by a middle portion 523. The middle portion 523 may be integral with or separated from the pair of the plate-shaped member 522, 522. A left end of the lower cross portion 52 is connected to the left side portion 53 by a supporting portion. The lower cross portion 52 turns relative to the left side portion 53 about the lower left axis G that extends substantially in the front-and-rear direction. A right end of the lower cross portion 52 is connected to the right side portion 54 by a supporting portion. The lower cross portion 52 turns relative to the right side portion 54 about the lower right axis H that extends substantially in the front-and-rear direction.

The left side portion 53 is on a left side of the headstock 211 and extends parallel to a direction in which the headstock 211 extends. The left side portion 53 is disposed above the left shock absorber 33 directly above the left front wheel 31. The left side portion 53 is connected to the first bracket 317 at a lower portion thereof and is attached so as to turn about the left steering axis Y1 relative to the first bracket 317. This left side portion 53 supports an upper portion of the left shock absorber 33 so as to allow it to turn about the left steering axis Y1.

The right side portion 54 is disposed on a right side of the headstock 211 and extends parallel to the direction in which the headstock 211 extends. The right side portion 54 is disposed above the right shock absorber 34 directly above the right front wheel 32. The right side portion 54 is connected to the second bracket 327 at a lower portion thereof and is attached so as to turn about the right steering axis Y2 relative to the second bracket 327. This right side portion 54 supports an upper portion of the right shock absorber 34 so as to allow it to turn about the right steering axis Y2.

In this manner, the upper cross portion 51, the lower cross portion 52, the left side portion 53, and the right side portion 54 are connected together in such a posture that the upper cross portion 51 and the lower cross portion 52 become parallel to each other and that the left side portion 53 and the right side portion 54 become parallel to each other.

Figure 4:
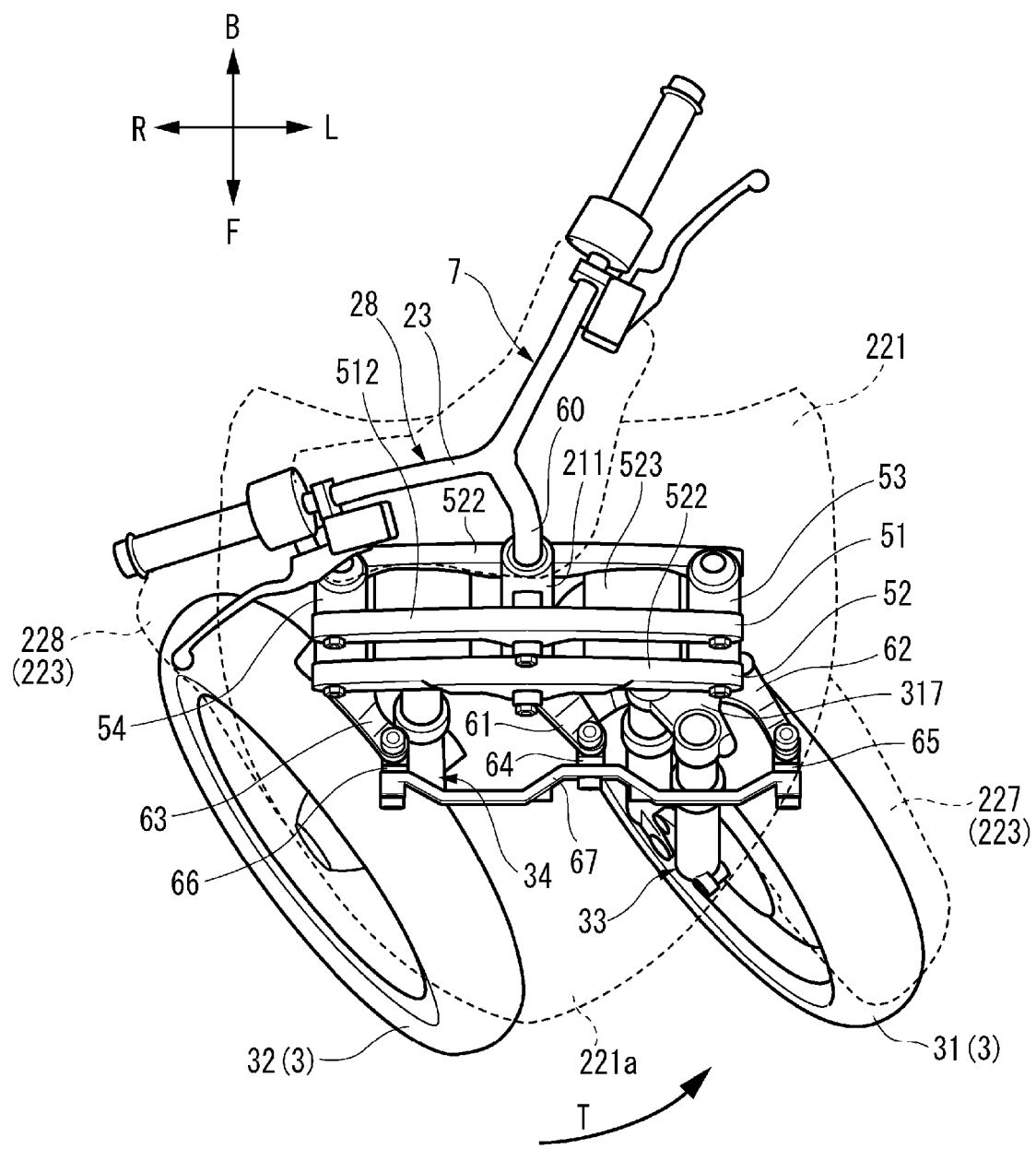
FIG. 4 is a plan view of the front portion of the vehicle in a state where the vehicle shown in FIG. 1 is steered.

FIG. 4 is a plan view of the front portion of the vehicle 1 when the vehicle 1 is steered to be turned, depicting how the vehicle 1 is steered to be turned.

As shown in FIG. 4, when the handlebar 23 is turned in the left-and-right direction, the steering effort transmission mechanism 6 of the steering mechanism 7 is activated to perform a steering operation. When the steering shaft 60 turns as a result of the handlebar 23 being turned, the first transmission plate 61 turns in association with the turning of the steering shaft 60. In particular, the front wheels 3 are turned by the steering force transmission mechanism 6 that moves in response to the turning of the steering shaft 60.

For example, when the steering shaft 60 turns in a direction indicated by an arrow T in FIG. 4, the tie rod 67 moves leftwards and rearwards in association with the turning of the first transmission plate 61. As this occurs, the first transmission plate 61 is allowed to turn relative to the first joint 64 by the turning shaft that extends in the up-and-down direction of the first joint 64, and the tie-rod 67 moves to the left rear while maintaining its posture. The second transmission plate 62 and the third transmission plate 63 turn in the direction indicated by the arrow T about the left side portion 53 and the right side portion 54, respectively, as the tie-rod 67 moves leftwards and rearwards. As this occurs, the second transmission plate 62 turns relative to the second joint 65 about the rotating shaft of the second joint 65 that extends in the up-and-down direction, and the third transmission plate 63 turns relative to the third joint 66 about the rotating shaft of the third joint 66 that extends in the up-and-down direction.

When the second transmission plate 62 and the third transmission plate 63 turn in the direction indicated by the arrow T, the first bracket 317 and the second bracket 327 turn in the direction indicated by the arrow T. When the first bracket 317 and the second bracket 327 turn in the direction indicated by the arrow T, the left front wheel 31 turns about the left steering axis Y1 (refer to FIG. 2) via the left shock absorber 33, and the right front wheel 32 turns about the right steering axis Y2 (refer to FIG. 2) via the right shock absorber 34.

FIG. 5 is a front view of the front portion of the vehicle 1 when the vehicle 1 is steered to be turned, depicting a leaning operation of the vehicle 1.

As shown in FIG. 5, the vehicle 1 leans to the left or right as the link mechanism 5 operates. The operation of the link mechanism 5 means that the individual members (the upper cross portion 51, the lower cross portion 52, the left side portion 53, and the right side portion 54) that activate a leaning operation in the link mechanism 5 turn relatively about their connecting points as axes so as to change the shape of the link mechanism 5.

In the link mechanism 5 of this preferred embodiment, for example, the upper cross portion 51, the lower cross portion 52, the left side portion 53, and the right side portion 54 which are disposed so as to define a rectangular shape or a substantially rectangular shape when viewed from the front with the vehicle 1 being in the upright state turn to change their shape into a parallelogram shape when the vehicle leans. The link mechanism 5 performs a leaning operation in association with the relative turning operation of the upper cross portion 51, the lower cross portion 52, the left side portion 53, and the right side portion 54 to cause the left front wheel 31 and the right front wheel 32 to lean accordingly.

For example, when the rider causes the vehicle 1 to lean to the left, the headstock 211 leans relative to the vertical direction. When the headstock 211 leans, the upper cross portion 51 turns relative to the headstock 211 about the upper middle axis C, and the lower cross portion 52 turns relative to the headstock 211 about the lower middle axis F. Then, the upper cross portion 51 moves farther to the left than the lower cross portion 52 and the left side portion 53 and the right side portion 54 lean relative to the vertical direction while being kept parallel to the headstock 211. The left side portion 53 and the right side portion 54 turn relative to the upper cross portion 51 and the lower cross portion 52 when the left side portion 53 and the right side portion 54 lean. Consequently, when the vehicle 1 is caused to lean, the left front wheel 31 and the right front wheel 32 that are supported on the left side portion 53 and the right side portion 54, respectively, lean while being kept parallel to the headstock 211 relative to the vertical direction as the left side portion 53 and the right side portion 54 lean.

Additionally, as they lean, the tie-rod 67 turns relative to the individual shaft portions, extending in the front-and-rear direction, of the first joint 64, the second joint 65, and the third joint 66. This allows the tie-rod 67 to maintain a parallel posture to the upper cross portion 51 and the lower cross portion 52 even though the vehicle 1 leans.

Figure 6:
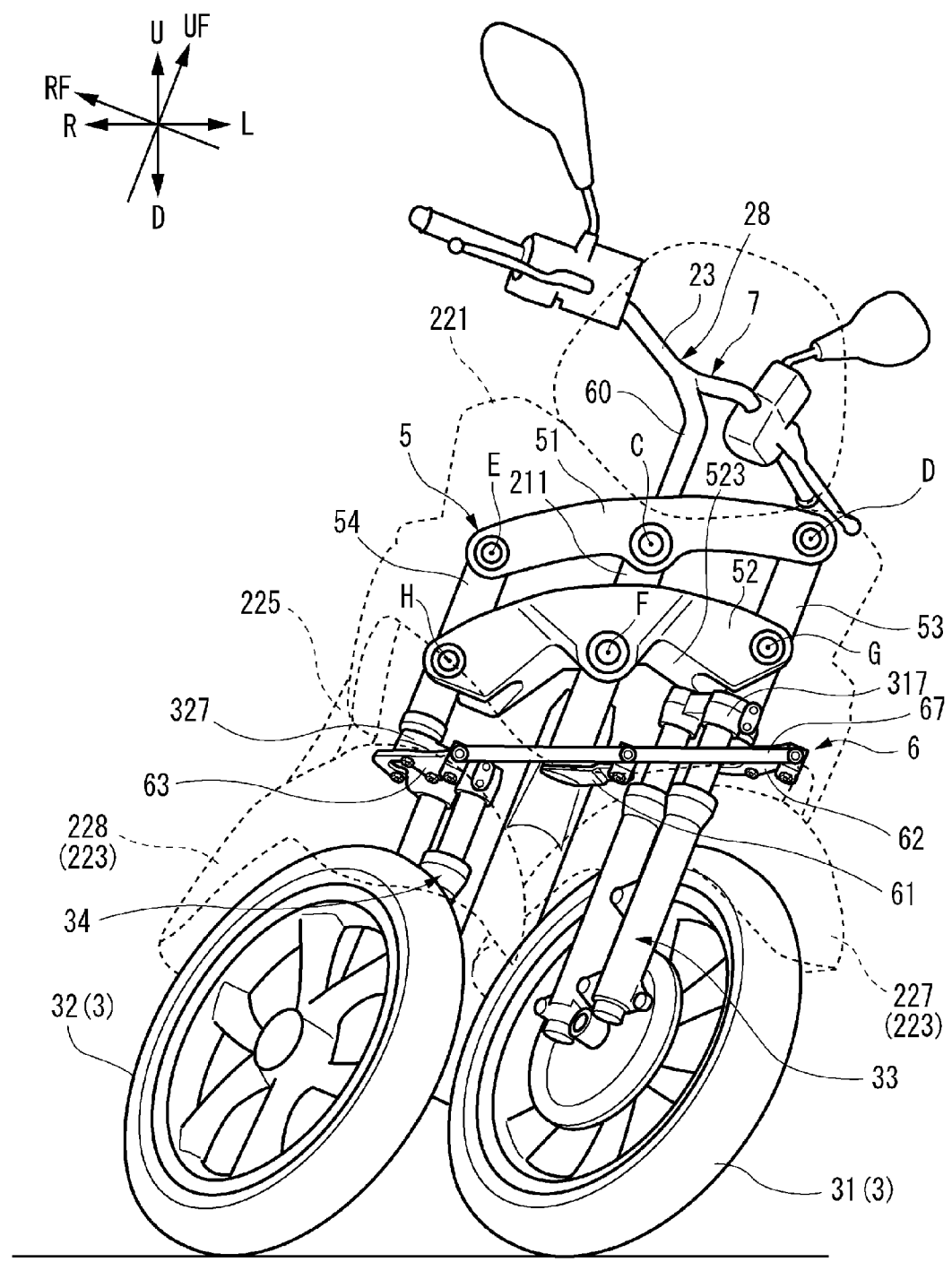
FIG. 6 is a front view of the front portion of the vehicle in a state where the vehicle shown in FIG. 1 is steered and is caused to lean.

FIG. 6 is a front view of the front portion of the vehicle 1 in a state where the vehicle 1 is steered and is caused to lean.

In FIG. 6, the vehicle 1 is steered to the left and is caused to lean to the left thereof. When the vehicle 1 operates as illustrated in FIG. 6, the directions of the left front wheel 31 and the right front wheel 32 are changed by the steering operation, and both the left front wheel 31 and the right front wheel 32 are caused to lean together with the body frame 21 by the leaning operation. In this state, the upper cross portion 51, the lower cross portion 52, the left side portion 53, and the right side portion 54 of the link mechanism 5 are turned to change their shape into a parallelogram, so that the tie-rod 67 moves leftwards or rightwards, that is, in a direction in which the vehicle 1 is steered (leftwards in FIG. 6) and rearwards.

Figure 7:
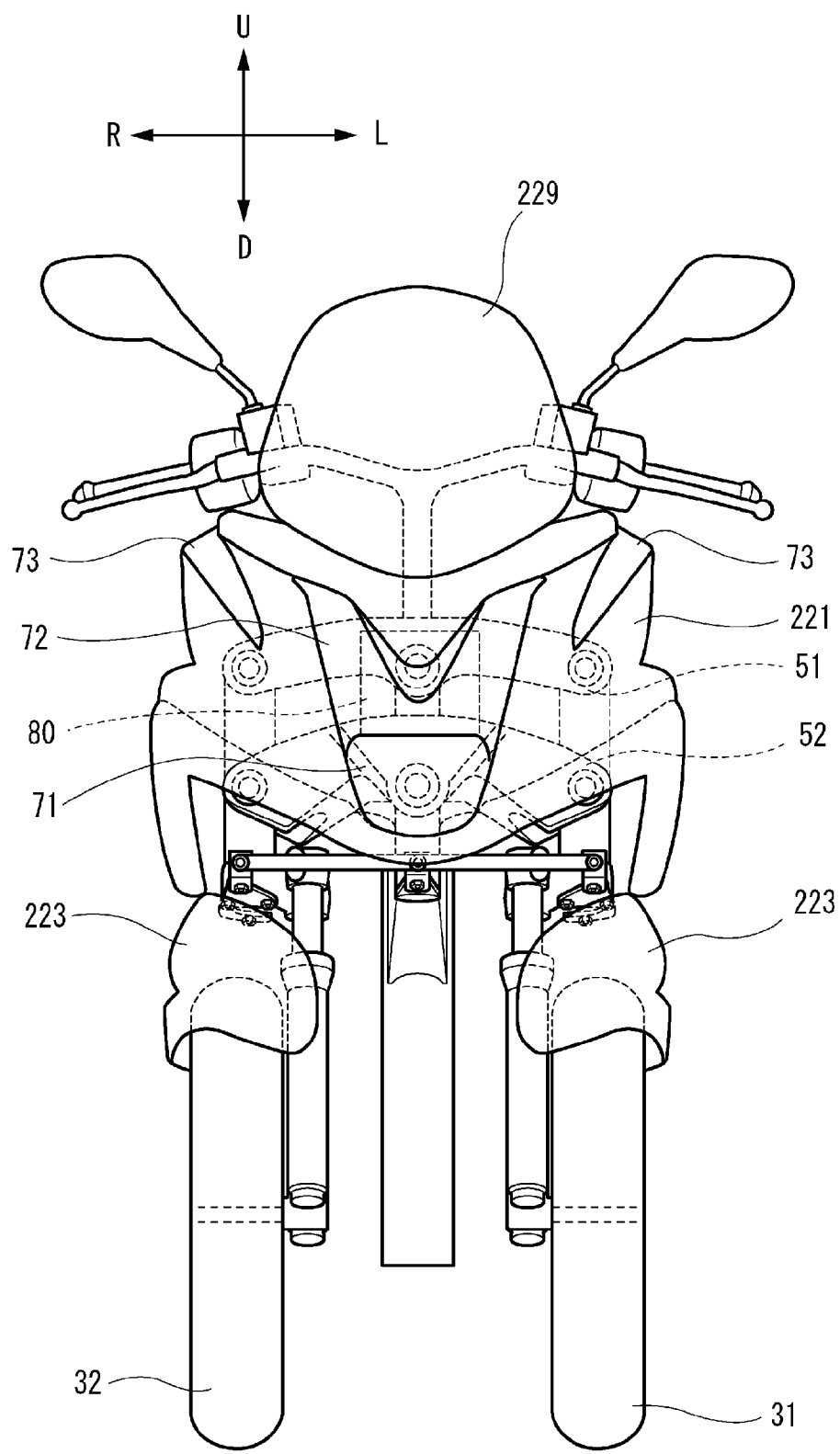
FIG. 7 is a front view of the vehicle showing the construction of a front portion of the vehicle.
Figures 8A, 8B:
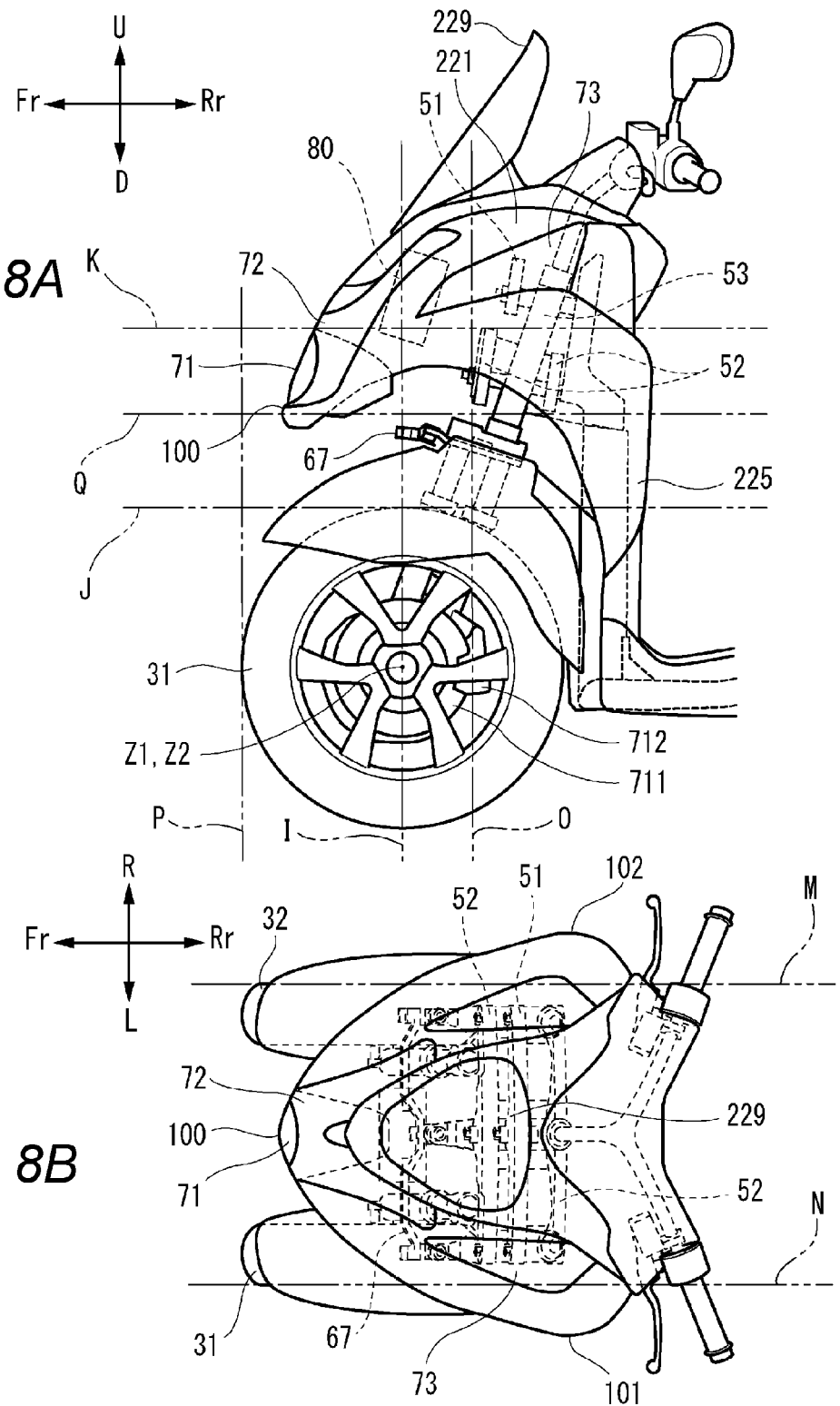
FIG. 8A is a side view of the vehicle shown in FIG. 7.
FIG. 8B is a plan view of the vehicle shown in FIG. 7.

Next, with reference to FIGS. 7 and 8, positions where the body cover 22 and the members that are disposed in an interior of the body cover 22 are disposed will be described in detail. FIG. 7 is a front view of a front portion of the vehicle 1 when the front wheels are not turned when the vehicle 1 is in the upright state. FIG. 8A is a side view of the vehicle shown in FIG. 7, and FIG. 8B is a plan view of the vehicle shown in FIG. 7.

As shown in FIGS. 7, 8A, and 8B, the vehicle 1 includes, as body cover members that define the front portion of the vehicle, an upper portion of the front cover 221, the leg shield 225, and a windshield 229. The front portion of the vehicle is a portion at the front of the vehicle 1 which has an external appearance that is integral with a headlamp 71. The front mud guard 223 that is disposed separately from the headlamp 71 does not define the front portion of the vehicle that is defined above. Additionally, the vehicle 1 according to the present preferred embodiment includes lamps in the interior of the body cover 22. As for the lamps, there are provided the headlamp 71, a positioning lamp 72, and turn signal lamps 73. The body cover members cover the headlamp 71, the upper cross portion 51, and at least a portion of a right side surface, a left side surface, and an upper surface of the lower cross portion 52.

The vehicle 1 includes the headlamp 71 at a central portion of the vehicle 1 in the left-and-right direction thereof as shown in FIG. 7, and the headlamp 71 includes a light source to emit light to the front of the vehicle. Additionally, the positioning lamp 72 is provided above the headlamp 71 so as to be adjacent thereto. The visibility of a road surface by the rider is enhanced by turning on the headlamp 71. The visibility of the vehicle 1 by the driver or rider of an oncoming vehicle or a pedestrian is enhanced by turning on the positioning lamp 72.

In the vehicle 1 of this preferred embodiment, the headlamp 71 and the positioning lamp 72 are integrated into a single lamp unit. The headlamp 71 and the positioning lamp 72 share a common housing and outer lens (an example of an outer cover).

As shown in FIG. 8A, the housing for the headlamp 71 and the positioning lamp 72 is provided in an interior of the front cover 221. The outer lens for the headlamp 71 and the positioning lamp 72 is exposed to the front from the front cover 221.

A projection lens, a light source, and a reflector are disposed in an interior of the headlamp 71 in such a manner as to be aligned in that order from the front to the rear of the headlamp 71. Because of this configuration, the headlamp 71 is long in the front-and-rear direction. Light from the light source in the headlamp 71 and light from a light source in the positioning lamp 72 are emitted to the front of the vehicle 1 via the outer lens.

The turn signal lamps 73 are provided on the left and right at an upper portion of the front portion of the vehicle as shown in FIG. 7. Drivers or riders of vehicles 1 or pedestrians around the vehicle 1 are informed of a travelling direction of the vehicle 1 by looking at the turn signal lamp 73 that is illuminated. The turn signal lamps 73 are provided so as to extend over the upper cross portion 51 in the front-and-rear direction. This enhances the visibility of the turn signal lamps 73 when looking at the vehicle 1 from both sides thereof.

The front cover 221 covers left and right side surfaces and at least a portion of an upper surface of the headlamp 71, left and right side surfaces and at least a portion of an upper surface of the upper cross portion 51, and left and right side surfaces and at least a portion of an upper surface of the lower cross portion 52. The outer lens for the headlamp 71 and the positioning lamp 72 and outer lenses of the turn signal lamps 73 are exposed to the outside from the front cover 221.

Additionally, in this preferred embodiment, as shown in FIG. 7, the positioning lamp 72 and the turn signal lamps 73 extend from the center to the sides of the vehicle 1 in the front view of the vehicle 1, which gives the front portion of the vehicle an external appearance that is pointed at a front end thereof and in which the voluminous appearance is reduced in the front view of the vehicle 1.

The headlamp 71 is disposed ahead of a rotating axis Z1 of the left front wheel 31 and a rotating axis Z2 of the right front wheel 32 (ahead of an additional line I) and above upper ends of the left front wheel 31 and the right front wheel 32 (above an additional line J) in relation to the up-and-down direction when the vehicle 1 is in the upright state and the front wheels are not turned as shown in FIG. 8A. The additional line I is a vertical line that passes through the rotating axes Z1, Z2. The additional line J is a horizontal line that passes through the upper ends of the left front wheel 31 and the right front wheel 32. In this manner, the headlamp 71 is disposed on a front side of the front portion of the vehicle so that the headlamp 71 does not interfere with the left front wheel 31 and the right front wheel 32 when the vehicle 1 is steered while being caused to lean.

Additionally, at least a portion of the headlamp 71 is disposed between the upper end and a lower end of the lower cross portion 52 (between an additional line K and an additional line Q) in relation to the up-and-down direction. The additional line K is a horizontal line that passes through the upper end of the lower cross portion 52. The additional line Q is a horizontal line that passes through the lower end of the lower cross portion 52. A front end portion of the lower cross portion 52 is disposed ahead of the upper cross portion 51. The link mechanism 5 is inclined so that a lower portion is disposed ahead of an upper portion thereof. Since a portion of the headlamp 71 is disposed between the upper end and the lower end of the lower cross portion 52 that is disposed ahead of the upper cross portion 51 at a front end thereof, the front cover 221 that covers the headlamp 71 and the link mechanism 5 has a shape in which a lower portion thereof projects to the front as shown in FIG. 8A.

As shown in FIG. 8B, at least a portion of the headlamp 71 is disposed on the left of a right end of the right front wheel 32 (on the left of an additional line M) and on the right of a left end of the left front wheel 31 (on the right of an additional line N) when the vehicle 1 is in the upright state. The additional line M passes through the right end of the right front wheel 32 to extend in the front-and-rear direction. The additional line N passes through the left end of the left front wheel 31 to extend in the front-and-rear direction.

Additionally, as shown in FIG. 8A, at least a portion of the headlamp 71 is disposed ahead of the front end of the lower cross portion 52 (ahead of an additional line O) and above the upper ends of the right front wheel 32 and the left front wheel 31 (above the additional line J) in the side view of the vehicle 1. The additional line O is a horizontal line that passes through the front end of the lower cross portion 52.

Further, at least a portion of the headlamp 71 is disposed below the upper end of the lower cross portion 52 (below the additional line K) in relation to the up-and-down direction of the body frame 21.

As shown in FIG. 8A, a portion of the front portion of the vehicle that is disposed in a frontmost position is referred to as a front end 100. In the vehicle 1 of this preferred embodiment, a front end of the front cover 221 that is disposed below the headlamp 71 defines the front end 100 of the front portion of the vehicle. As shown in FIG. 8A, in the side view of the vehicle 1, the front end 100 is disposed above the upper ends of the left front wheel 31 and the right front wheel 32 (above the additional line J) and below the upper end of the lower cross portion 52 (below the additional line K). Additionally, as shown in FIG. 8B, in the top view of the vehicle 1, the front end 100 is disposed between the left front wheel 31 and the right front wheel 32. In particular, the front portion of the vehicle has a shape in which a lower portion at the center in the left-and-right direction projects to the front.

In addition, an outline of an upper portion of the front portion of the vehicle that appears in the side view of the vehicle 1 is referred to as an upper edge of the front portion of the vehicle. As shown in FIG. 8A, an upper edge portion includes the outer lens of the headlamp 71, the outer lens of the positioning lamp 72, the front cover 221, and the windshield 229. The upper edge of the front portion of the vehicle extends from the front end 100 to above the upper end of the upper cross portion 51 and to behind the front end of the lower cross portion 52 in the side view of the vehicle 1.

As shown in FIG. 8A, as to the front portion of the vehicle that includes the headlamp 71 and the body cover 22, the front edge of the front portion of the vehicle extends from the front end 100 to above the upper cross portion 51 and to behind the front end of the lower cross portion 52 in the side view of the vehicle 1 when the vehicle 1 is in the upright state.

The front end 100 of the front portion of the vehicle is disposed on the left of the right end of the right front wheel 32 (on the left of the additional line M) and on the right of the left end of the left front wheel 31 (on the right of the additional line N) when the vehicle 1 is in the upright state. Additionally, as shown in FIG. 8A, the front end 100 of the front portion of the vehicle is disposed ahead of the front end of the lower cross portion 52 (ahead of the additional line O) and above the upper ends of the right front wheel 32 and the left front wheel 31 (above the additional line J) in the side view of the vehicle 1. Further, the front end 100 of the front portion of the vehicle is disposed below the upper end of the lower cross portion 52 (below the additional line K) in relation to the up-and-down direction of the body frame 21.

As shown in FIG. 8B, an outline of a left portion of the front portion of the vehicle that appears in the top view of the vehicle 1 is referred to as a left edge of the front portion of the vehicle. In addition, an outline of a right portion of the front portion of the vehicle that appears in the top view of the vehicle 1 is referred to as a right edge of the front portion of the vehicle. The left edge and right edge of the vehicle 1 are defined by the outer lens of the headlamp 71, the outer lens of the positioning lamp 72, and the front cover 221.

The left edge of the front portion of the vehicle extends from the front end 100 to the left of a left end of the upper cross portion 51 in the top view of the vehicle 1. A left end 101 of the left edge of the front portion of the vehicle is disposed on the left of the left front wheel 31 (on the left of the additional line N). Additionally, the left end 101 of the left edge of the front portion of the vehicle is disposed behind the front lower cross portion 52 of the lower cross portions 52 that are arranged back and forth in the front-and-rear direction. The left end 101 of the left edge of the front portion of the vehicle is disposed behind the upper cross portion 51.

Similarly, the right edge of the front portion of the vehicle extends from the front end 100 to the right of a right end of the upper cross portion 51. A right end 102 of the right edge of the front portion of the vehicle is disposed on the right of the right front wheel 32 (on the right of the additional line M). Additionally, the right end 102 of the right edge of the front portion of the vehicle is disposed behind the front lower cross portion 52 of the lower cross portions 52 that are arranged back and forth in the front-and-rear direction. Further, a right end portion of the right edge of the front portion of the vehicle is disposed behind the upper cross portion 51.

In this manner, in the vehicle 1 according to this preferred embodiment, also in the top view of the vehicle 1, the front end 100 projects forward at a central portion of the front portion of the vehicle in the left-and-right direction, and left and right edge portions extend from the front end 100 to outer sides of the left and right end portions of the upper cross portion 51. Because of this, the front portion of the vehicle is tapered towards the headlamp 71 from the right end portion of the right edge and the left end portion of the left edge of the front portion of the vehicle. In particular, the front portion of the vehicle has a streamlined shape in which front portions of the left and right end portions of the front portion of the vehicle are cut out, thus reducing the voluminous appearance of the front portion of the vehicle. Additionally, since the left and right end portions 101, 102 of the front portion of the vehicle are disposed behind the rear lower cross portion 52, also in the top view of the vehicle 1, angles defined by the left edge and the right edge of the front portion of the vehicle and the travelling direction of the vehicle 1 become small, thus providing the vehicle 1 with a small air resistance.

In addition, as shown in FIG. 8B, in case the left and right end portions 101, 102 of the front portion of the vehicle are disposed behind the upper cross portion 51 that is disposed behind the front end of the lower cross portion 52 at their front ends, the angles defined by the left edge and the right edge and the travelling direction of the vehicle 1 are smaller.

Different from the present preferred embodiment, if the headlamp is disposed directly ahead of the upper cross portion, since the upper cross portion is disposed behind the front end of the front lower cross portion, a distance in the front-and-rear direction between the front end of the headlamp and the front end of the lower cross portion becomes short. Then, an angle defined by the upper edge of the front portion of the vehicle that extends from the outer lens of the headlamp to the front cover that covers the front of the lower cross portion and the travelling direction of the vehicle 1 becomes large. This causes the front portion of the vehicle to have a rectangular parallelepiped shape, thus increasing the voluminous appearance of the front portion of the vehicle. Additionally, this increases the air resistance.

In contrast with this, according to the vehicle of this preferred embodiment, the front portion of the vehicle has a streamlined shape in which the front portion is partially cut out, so that the voluminous appearance is reduced.

In FIGS. 7, 8A, and 8B, reference numeral 80 denotes the hydraulic unit. The fluid unit 80 is preferably a metallic member. A plurality of flow paths are provided in an interior of the fluid unit 80. The fluid unit 80 is one of the constituent elements of a so-called ABS (Anti-lock Braking System). The fluid unit 80 controls the operations of brake devices of the front wheels and the rear wheels by switching the flow paths through which a brake fluid flows. As shown in FIG. 8A, the brake device includes a brake disc 711 that rotates together with the front wheel 3 and a brake caliper 712 that applies a braking force to the rotation of the brake disc 711.

At least a portion of this fluid unit 80 is aligned with the headlamp 71 in a vertical direction at a central portion in the vehicle's width direction as shown in FIG. 7 and in FIG. 8B. The headlamp 71 and the fluid unit 80 are both heavy. Because of this, the weight of the vehicle 1 is balanced uniformly in the left-and-right direction and hence the weight of the vehicle 1 is balanced easily by providing the headlamp 71 and the fluid unit 80 so as to be aligned with each other in the vertical direction at the central portion in the left-and-right direction.

Additionally, at least a portion of the fluid unit 80 is provided between the headlamp 71 and the upper cross portion 51 in the front view of the vehicle 1 as shown in FIG. 7. The center of gravity of the vehicle 1 is lowered by providing the fluid unit 80 below the upper end of the upper cross portion 51.

In the vehicles described in U.S. Design Pat. No. 547,242 and Catalogo partidi ricambio, MP3 300ie LT Mod. ZAPM64102, Piaggio that include the body frame that leans and the two front wheels, at least a portion of the headlamp is provided inwards of the body cover. The headlamp is a device that includes a light source and an outer cover that is provided in a position spaced from the front of the light source and that is hence long in the front-and-rear direction. The headlamp that is long in the front-and-rear direction is disposed in the space in front of the upper cross portion. Namely, in U.S. Design Pat. No. 547,242 and Catalogo partidi ricambio, MP3 300ie LT Mod. ZAPM64102, Piaggio, a reduction in the voluminous appearance of the front portion of the vehicle is attempted by making the front portion of the vehicle compact based on the idea that the headlamp is disposed in the space in front of the upper cross portion, which is dead space.

On the other hand, in general, in case a front edge of the front portion of the vehicle is shaped so that a front end and an upper end thereof are connected smoothly, it is easy to reduce the air resistance. Then, in the vehicles described in U.S. Design Pat. No. 547,242 and Catalogo partidi ricambio, MP3 300ie LT Mod. ZAPM64102, Piaggio that includes the body frame that leans and the two front wheels, a front end of the front portion of the vehicle projects to a position located ahead of the front wheels in the side view of the vehicle. This configuration enables the front edge of the front portion of the vehicle to be shaped so that the front end is connected smoothly to the upper end thereof that is disposed above the upper cross portion. In U.S. Design Pat. No. 547,242 and Catalogo partidi ricambio, MP3 300ie LT Mod. ZAPM64102, Piaggio, the reduction in air resistance is achieved by using the configuration described above.

However, in the vehicles described in U.S. Design Pat. No. 547,242 and Catalogo partidi ricambio, MP3 300ie LT Mod. ZAPM64102, Piaggio that include the body frame that leans and the two front wheels, as has been described above, the front end of the lower cross portion is disposed ahead of the upper cross portion, and the headlamp that is long in the front-and-rear direction is disposed directly ahead of the upper cross portion. Because of this, a front end of the headlamp and the front end of the lower cross portion are disposed near each other in relation to the front-and-rear direction. Because of this, in a side view of the vehicle, a portion that connects a portion that defines a portion of the front edge of the front portion of the vehicle and that is disposed in an area that is occupied by the headlamp in relation to an up-and-down direction (hereinafter, referred to as a headlamp area front edge portion) with a portion of the front edge of the front portion of the vehicle that is disposed in front of the lower cross portion has a shape that extends perpendicularly or substantially perpendicular, increasing the air resistance.

To describe this in greater detail, in the vehicles described in U.S. Design Pat. No. 547,242 and Catalogo partidi ricambio, MP3 300ie LT Mod. ZAPM64102, Piaggio that includes the body frame that leans and the two front wheels, the headlamp that is long in the front-and-rear direction is disposed in front of the upper cross portion that is located near the upper end of the front portion of the vehicle. Because of this, the front edge of the front portion of the vehicle tends to have a bent shape in which an inclination angle relative to a horizontal plane of the portion from the upper end to the headlamp area front edge portion is small, while an inclination angle to a horizontal plane of the portion from the headlamp area front edge portion to the front end is large. Because of this, the air resistance tends to be increased easily at the portion of the front edge of the front portion of the vehicle that extends from the headlamp area front edge portion to the front end.

Then, in the vehicles described in U.S. Design Pat. No. 547,242 and Catalogo partidi ricambio, MP3 300ie LT Mod. ZAPM64102, Piaggio that include the body frame that leans and the two front wheels, a lower portion of the headlamp area front edge portion extends to the front of the front wheels, and the front edge of the front portion of the vehicle is positioned directly ahead of the front wheels so that the front edge of the front portion of the vehicle has a rectilinear shape, thus reducing the air resistance. However, as a result of the front end of the front portion of the vehicle being extended to the front of the front wheels, the front portion of the vehicle tends to have a voluminous appearance.

In particular, the inventors discovered the fact that even in the event that, as in U.S. Design Pat. No. 547,242 and Catalogo partidi ricambio, MP3 300ie LT Mod. ZAPM64102, Piaggio, (a) the idea that the voluminous appearance is reduced by disposing the headlamp in the dead space in front of the upper cross portion and (b) the idea that the front edge of the front portion of the vehicle is shaped so that the front end is connected smoothly to the upper end to reduce the air resistance are combined together, it is difficult for the reduction in air resistance to be compatible with the reduction in the voluminous appearance. Then, the inventors studied a configuration in which the headlamp 71 that is long in the front-and-rear direction is disposed in the space in front of the lower cross portion 52 and the front end 100 of the front portion of the vehicle is disposed near the area where the headlamp 71 is disposed, and conceived of and developed various preferred embodiments of the present invention.

At a glance, in considering U.S. Design Pat. No. 547,242 and Catalogo partidi ricambio, MP3 300ie LT Mod. ZAPM64102, Piaggio, it is necessary that the front portion of the vehicle is enlarged in size in the front-and-rear direction as a result of the headlamp 71 that is long in the front-and-rear direction being disposed in the space directly ahead of the lower cross portion 52 that is disposed ahead of the upper cross portion 51 at the front end thereof. Additionally, in case the front end 100 of the front portion of the vehicle is disposed above the upper ends of the right front wheel 32 and the left front wheel 31, it is difficult for the front edge of the front portion of the vehicle to have a smooth rectilinear shape and hence to reduce the air resistance.

However, the inventors discovered that the voluminous appearance of the front portion of the vehicle is able be reduced while reducing the air resistance thereat by making the front portion of the vehicle into such a shape that the front end 100 thereof projects downwards and forward by positioning the headlamp 71 below the upper end of the lower cross portion 52, and conceived of and developed of various preferred embodiments of the present invention.

In particular, according to the vehicle 1 of the present preferred embodiment which includes the body frame 21 that leans and the two front wheels 3, at least a portion of the headlamp 71 is disposed on the left of the right end of the right front wheel 32 and on the right of the left end of the left front wheel 31 when the vehicle 1 is in the upright state and is disposed above the upper ends of the right front wheel 32 and the left front wheel 31 and below the upper end of the lower cross portion 52 in relation to the up-and-down direction of the body frame 21 in the position located ahead of the front end of the lower cross portion 52 in the side view of the vehicle 1.

Compared with the vehicles described in U.S. Design Pat. No. 547,242 and Catalogo partidi ricambio, MP3 300ie LT Mod. ZAPM64102, Piaggio, the headlamp 71 of the vehicle 1 according to the present preferred embodiment is provided in a lower position that is located below the upper end of the lower cross portion 52. Since the headlamp 71 is long in the front-and-rear direction, the headlamp area front edge portion of the front edge of the front portion of the vehicle is disposed in the area that is located lower and farther forward.

Additionally, according to the vehicle 1 of the present preferred embodiment, as to the front portion of the vehicle that includes the headlamp 71 and the body cover 22, the front edge of the front portion of the vehicle extends from the front end to above the upper cross portion 51 and to behind the front end of the lower cross portion 52 in the side view of the vehicle 1 when the vehicle 1 is in the upright state. Further, the front end 100 of the front portion of the vehicle is disposed on the left of the right end of the right front wheel 32 and on the right of the left end of the left front wheel 31 when the vehicle 1 is in the upright state and is disposed above the upper ends of the right front wheel 32 and the left front wheel 31 and below the upper end of the lower cross portion 52 in relation to the up-and-down direction of the body frame 21 in the position located ahead of the front end of the lower cross portion 52 in the side view of the vehicle 1.

According to the vehicle 1 of the present preferred embodiment, the front end 100 of the front portion of the vehicle is disposed in the area where at least a portion of the headlamp 71 is disposed and which is located above the upper ends of the right front wheel 32 and the left front wheel 31 and below the upper end of the lower cross portion 52.

In the vehicle 1 according to the present preferred embodiment, as has been described above, the headlamp area front edge portion of the front edge of the front portion of the vehicle is disposed in the area that is located lower and farther forward in the side view of the vehicle 1. Further, since the front end 100 of the front portion of the vehicle is disposed at the headlamp area front edge portion or ahead thereof, the front end 100 of the front portion of the vehicle is able to be disposed in the area that is located lower and farther forward. In particular, the front end 100 of the front portion of the vehicle is disposed in a position that is spaced a large distance forward and downward from the upper end of the front portion of the vehicle. Because of this, the front edge of the front portion of the vehicle has a smoothly continuous rectilinear or substantially rectilinear shape from the upper end to the front end of the front portion of the vehicle.

Additionally, since the front end 100 of the front portion of the vehicle is disposed above the upper ends of the right front wheel 32 and the left front wheel 31, the front portion of the vehicle has a compact shape in the up-and-down direction, so that the voluminous appearance of the front portion of the vehicle is reduced. Further, the front end of the front portion of the vehicle is disposed above the upper ends of the right front wheel 32 and the left front wheel 31 and below the upper end of the lower cross portion 52 in relation to the up-and-down direction of the body frame 21 in the position that is located ahead of the front end of the lower cross portion 52. Namely, the front portion of the vehicle has a shape in which the front end thereof projects to the front in a lower position (for example, a shell-like shape). Because of this, it is easy for the portion located near the eyes of the user who rides on the vehicle 1 to be small, so that the voluminous appearance is easily reduced.

For the reasons described heretofore, there is provided the vehicle 1 including the headlamp 71 disposed in the interior of the body cover 22 in which the voluminous appearance of the front portion of the vehicle is reduced while reducing the air resistance.

In addition, in the vehicle 1 according to this preferred embodiment, as shown in FIG. 8B, the right end 102 and the left end 101 of the front portion of the vehicle are disposed behind the front end of the lower cross portion 52 in the top view of the vehicle 1 when the vehicle 1 is in the upright state.

Also in the top view of the vehicle 1, the front portion of the vehicle has the shape in which the front end 100 thereof projects ahead of the right end 102 and the left end 101 of the front portion of the vehicle, so that the voluminous appearance of the front portion of the vehicle is reduced while reducing the air resistance.

In addition, in the vehicle 1 according to this preferred embodiment, as shown in FIG. 8B, the right end 102 and the left end 101 of the front portion of the vehicle are disposed behind the front end of the upper cross portion 51 in the top view of the vehicle 1 when the vehicle 1 is in the upright state.

The front portion of the vehicle is has the shape in which the front end 100 projects farther ahead of the right end 102 and the left end 101 of the front portion of the vehicle in the top view of the vehicle 1, so that the voluminous appearance of the front portion of the vehicle is reduced while reducing the air resistance.

In the vehicle 1 according to the present preferred embodiment, the right end 102 and the left end 101 of the front portion of the vehicle are disposed behind the rear end of the lower cross portion 52 in the top view of the vehicle 1 when the vehicle 1 is in the upright state as shown in FIG. 8B.

The front portion of the vehicle has the shape in which the front end 100 projects farther ahead of the right end 102 and the left end 101 of the front portion of the vehicle in the top view of the vehicle 1, so that the voluminous appearance of the front portion of the vehicle is reduced while reducing the air resistance.

In addition, in the vehicle 1 according to the present preferred embodiment, the right end 102 and the left end 101 of the front portion of the vehicle are disposed behind the rear end of the upper cross portion 51 in the top view of the vehicle 1 when the vehicle 1 is in the upright state as shown in FIG. 8B.

The front portion of the vehicle has the shape in which the front end 100 projects farther ahead of the right end 102 and the left end 101 of the front portion of the vehicle in the top view of the vehicle 1, so that the voluminous appearance of the front portion of the vehicle is reduced while reducing the air resistance.

In addition, in the vehicle 1 according to this preferred embodiment, as shown in FIG. 8A, the front end 100 of the front portion of the vehicle is disposed behind front ends (an additional line P) of the right front wheel 32 and the left front wheel 31 in the top view of the vehicle 1 when the vehicle 1 is in the upright state. The additional line P is a vertical line that passes through the front ends of the right front wheel 32 and the left front wheel 31.

As has been described above, the front portion of the vehicle is reduced in length in the front-and-rear direction while the front edge of the front portion of the vehicle has a smooth rectilinear or substantially rectilinear shape, so that the voluminous appearance of the front portion of the vehicle is reduced even more.

Additionally, in the vehicle according to this preferred embodiment, as shown in FIG. 8A, at least a portion of the headlamp 71 is disposed above the lower end (the additional line Q) of the lower cross portion 52 in relation to the up-and-down direction of the body frame 21 in the side view of the vehicle 1 when the vehicle 1 is in the upright state.

Since at least a portion of the headlamp 71 is disposed above the lower end (the additional line Q) of the lower cross portion 52, even in the event that the body frame 21 leans, the headlamp 71 is prevented from interfering with the front wheels 3. The vehicle 1 is provided which includes the headlamp 71 that is prevented from interfering with the front wheels 3 while maintaining a low air resistance and a compact size of the front portion of the vehicle.

Additionally, in the vehicle 1 according to this preferred embodiment, as shown in FIG. 8A, at least a portion of the headlamp 71 is disposed ahead of the rotating axes Z2, Z1 (the additional line I) of the right front wheel 32 and the left front wheel 31 in the side view of the vehicle 1 when the vehicle 1 is in the upright state.

Since at least a portion of the headlamp 71 is disposed ahead of the rotating axes Z2, Z1 of the right front wheel 32 and the left front wheel 31, the portion of the front edge of the front portion of the vehicle which is located directly ahead of the headlamp 71 and the front end 100 which is located ahead of that portion is disposed farther forward. This makes it easy for the front portion of the vehicle to have a shape in which the front end 100 projects farther forward, so that the vehicle 1 is provided in which the air resistance is small and the voluminous appearance of the front portion of the vehicle is small.

In addition, in the vehicle 1 according to this preferred embodiment, as shown in FIG. 8A, at least a portion of the outer cover that covers the light source of the headlamp 71 defines a portion of the front edge of the front portion of the vehicle in the side view of the vehicle 1.

Since at least a portion of the transparent or translucent outer cover defines a portion of the front edge of the front portion of the vehicle, an impression is imparted that a portion of the front portion of the vehicle is cut out in the side view of the vehicle 1, thus making it possible to provide the vehicle 1 in which the voluminous appearance of the front portion of the vehicle is reduced further.

In addition, in the vehicle 1 according to this preferred embodiment, as shown in FIG. 8B, the front portion of the vehicle has the shape in which the front end portion of the vehicle is tapered towards the headlamp 71 from the right end 102 and the left end 101 thereof in the top view of the vehicle 1.

Also in the top view of the vehicle 1, the front end 100 of the front portion of the vehicle has a tapered shape in which the front end 100 thereof projects ahead of the right end 102 and the left end 101 of the front portion of the vehicle, so that the voluminous appearance of the front portion of the vehicle is reduced while reducing the air resistance.

Additionally, the vehicle 1 according to the present preferred embodiment has, as shown in FIG. 7, the brake device that applies a braking force to at least one of the right front wheel 32 and the left front wheel 31 and the fluid unit 80 that includes the plurality of flow paths to control the operation of the brake device by switching the flow paths through which the brake fluid flows.

At least a portion of the fluid unit 80 is aligned with the headlamp 71 along the vertical direction when the vehicle 1 is in the upright state.

The headlamp 1 and the fluid unit 80 are both heavy devices, and since the headlamp 71 and at least a portion of the fluid unit 80 are aligned with each other along the vertical direction, it is easy to balance the weight of the front portion of the vehicle in relation to the left-and-right direction and the front-to-right direction.

In addition, in the vehicle 1 according to the present preferred embodiment, as shown in FIG. 7, at least a portion of the fluid unit 80 is provided between the headlamp 71 and the upper cross portion 51 in the front view of the vehicle 1 when the vehicle 1 is in the upright state.

Since at least a portion of the fluid unit 80 is disposed above the headlamp 71, the interference of the fluid unit 80 with the right front wheel 32 and the left front wheel 31 is easily prevented. Additionally, since at least a portion of the fluid unit 80 is disposed below the upper cross portion 51, the center of gravity of the vehicle 1 is prevented from becoming high. This provides the vehicle 1 including the fluid unit 80 mounted thereon in such a manner as to prevent the center of gravity of the vehicle 1 from becoming high while preventing the interference of the fluid unit 80 with the front wheels 3.

Second Preferred Embodiment

Figure 9:
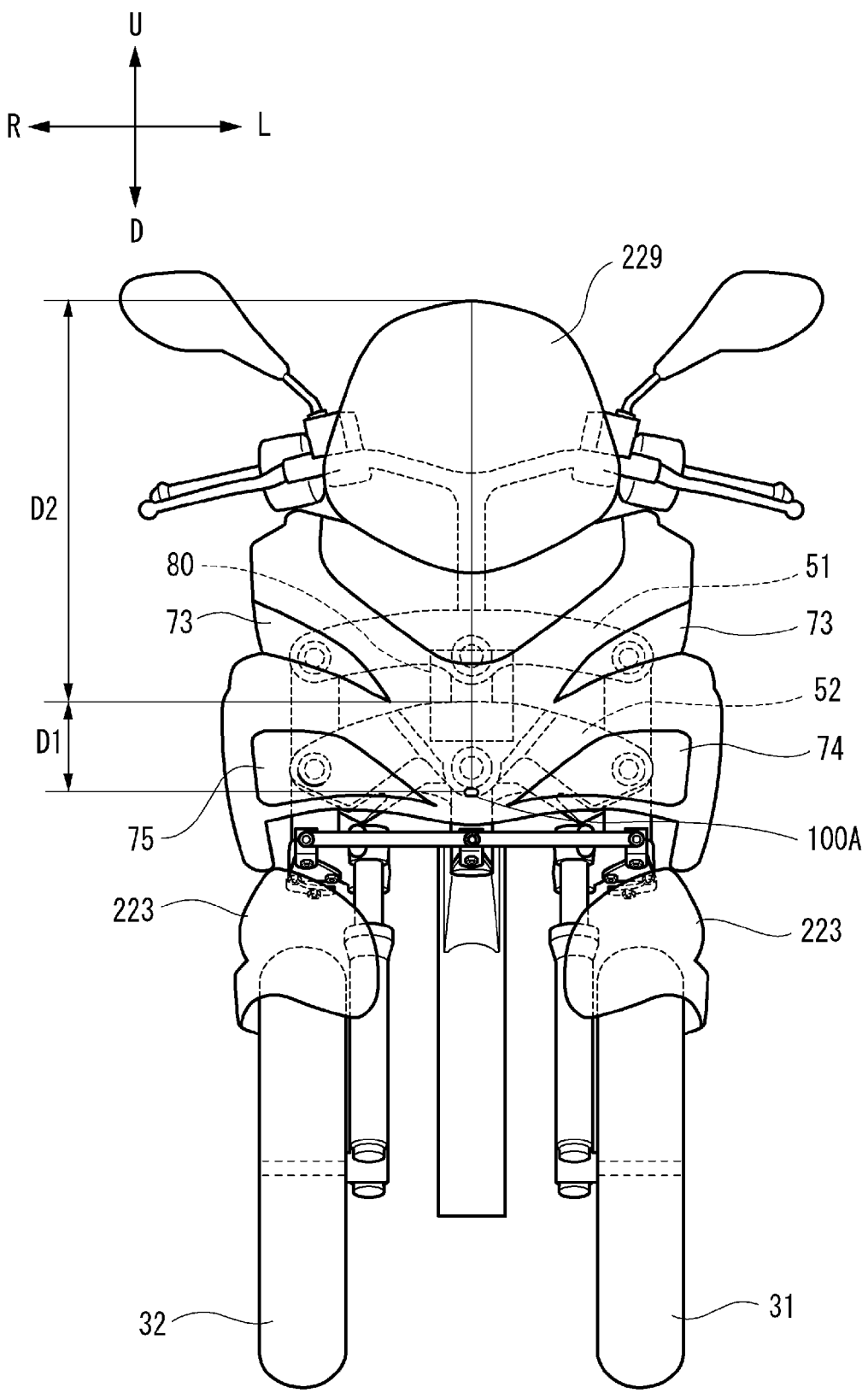
FIG. 9 is a front view of a vehicle according to a second preferred embodiment of the present invention.
Figures 10A, 10B:
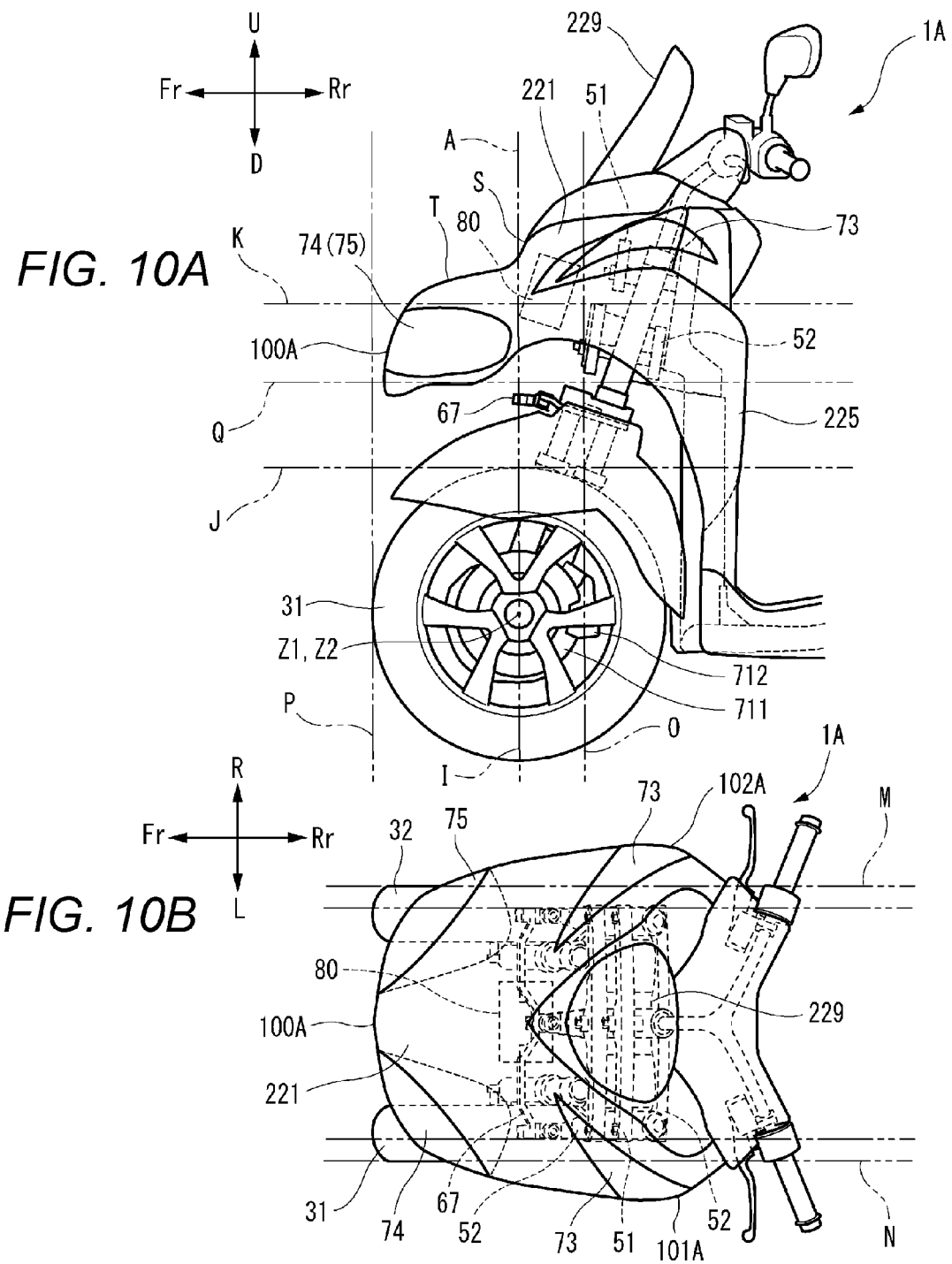
FIG. 10A is a side view of the vehicle shown in FIG. 9.
FIG. 10B is a plan view of the vehicle shown in FIG. 9.

In the first preferred embodiment that has been described above, while the vehicle 1 is described as preferably including the single headlamp 71 mounted thereon, the present invention is not limited thereto. The present invention can also be applied to a vehicle 1A including a plurality of headlamps mounted thereon. FIG. 9 is a front view of a front portion of the vehicle 1A when the vehicle 1 is in the upright state and is stopped. FIG. 10A is a side view of the front portion of the vehicle 1A shown in FIG. 9, and FIG. 10B is a plan view of the vehicle 1A shown in FIG. 9.

The vehicle 1A according to the second preferred embodiment includes a left headlamp 74 and a right headlamp 75 that are spaced apart from each other in a left-and-right direction. As with the first preferred embodiment described above, the headlamps 74, 75 are disposed ahead of a rotating axis of a left front wheel 31 and a rotating axis of a right front wheel 32 (ahead of an additional line I) and above upper ends of the left front wheel 31 and the right front wheel 32 (above an additional line J) in relation to an up-and-down direction when the vehicle 1A is in the upright state and the front wheels are not turned. In this manner, the headlamps 74, 75 are disposed on a front side of the front portion of the vehicle so that the headlamps 74, 75 do not interfere with the left front wheel 31 and the right front wheel 32 when the vehicle 1A is steered while being caused to lean.

Additionally, at least portions of the headlamps 74, 75 are disposed between an upper end and a lower end of a lower cross portion 52 (between an additional line K and an additional line Q) in relation to the up-and-down direction. Because of this configuration, a front cover 221 that covers the headlamps 74, 75 and the link mechanism 5 has a shape in which a lower portion thereof projects to the front as shown in FIG. 10A.

As shown in FIG. 10B, at least portions of the headlamps 74, 75 are disposed on the left of a right end of the right front wheel 32 (on the left of an additional line M) and on the right of a left end of the left front wheel 31 (on the right of an additional line N) when the vehicle 1A is in the upright state. As shown in FIG. 10A, at least portions of the headlamps 74, 75 are disposed ahead of a front end of the lower cross portion 52 (ahead of an additional line O) and above the upper ends of the right front wheel 32 and the left front wheel 31 (above the additional line J) in the side view of the vehicle 1A. Further, at least portions of the headlamps 74, 75 are disposed below the upper end of the lower cross portion 52 (below the additional line K) in relation to the up-and-down direction of the body frame 21.

As shown in FIG. 10A, in the vehicle 1A of this preferred embodiment, a front end of the front cover 221 defines a front end 100A of the front portion of the vehicle. As shown in FIG. 10A, in the side view of the vehicle 1A, the front end 100A is disposed above the upper ends (the additional line J) of the left front wheel 31 and the right front wheel 32 and below the upper end (the additional line K) of the lower cross portion 52. Additionally, as shown in FIG. 10B, in the plan view of the vehicle 1A, the front end 100A is disposed between the left front wheel 31 and the right front wheel 32. In particular, the front portion of the vehicle has a shape in which a lower portion at the center in the left-and-right direction projects to the front.

Additionally, as shown in FIG. 10A, an upper edge of the front portion of the vehicle includes outer lenses of the headlamps 74, 75, the front cover 221, and a windshield 229. The front edge of the front portion of the vehicle extends to above an upper end of an upper cross portion 51 and to behind a front end of the lower cross portion 52 in the side view of the vehicle 1A.

In this manner, the front edge of the front portion of the vehicle extends from the front end 100A of the front portion of the vehicle that projects downwards and forward to above the upper end of the upper cross portion 51 and to behind the front end of the lower cross portion 52. Because of this, in the side view of the vehicle 1A, the front edge is inclined so that a vertical dimension of the front portion of the vehicle increases from the front to the rear. This allows the front portion of the vehicle to have a shape in which the front of the upper cross portion 51 of the link mechanism. 5 is cut out so as to reduce the voluminous appearance of the front portion of the vehicle in the side view of the vehicle 1A. Additionally, since an angle that is defined by the front edge of the front portion of the vehicle and the travelling direction of the vehicle 1A becomes small, it is possible to provide the vehicle 1A having a small air resistance.

As shown in FIG. 10A, as to the front portion of the vehicle that includes the headlamps 74, 75 and the body cover 22, the front edge of the front portion of the vehicle extends from the front end 100A to above the upper cross portion 51 and to behind the front end of the lower cross portion 52 in the side view of the vehicle 1A when the vehicle 1A is in the upright state.

The front end 100A of the front portion of the vehicle is disposed on the left of the right end of the right front wheel 32 (on the left of the additional line M) and on the right of the left end of the left front wheel 31 (on the right of the additional line N) when the vehicle 1 is in the upright state. Additionally, as shown in FIG. 10A, the front end 100A of the front portion of the vehicle is disposed ahead of the front end of the lower cross portion 52 (ahead of the additional line O) and above the upper ends of the right front wheel 32 and the left front wheel 31 (above the additional line J) in the side view of the vehicle 1A. Further, the front end 100A of the front portion of the vehicle is disposed below the upper end of the lower cross portion 52 (below the additional line K) in relation to the up-and-down direction of the body frame 21.

Additionally, in the side view of the vehicle 1A, an inclination angle of a surface S of the front cover 221 that covers a front surface of the upper cross portion 51 relative to a horizontal plane is greater than an inclination angle of a surface of the front cover that is disposed directly above the headlamps 74, 75 relative to the horizontal plane. The voluminous appearance of the front portion of the vehicle becomes small and hence, the air resistance of the vehicle 1A becomes small as a result of the lower portion of the front portion of the vehicle projecting forward from the front portion of the vehicle in the manner described above.

The outer lenses of the headlamps 74, 75 preferably extend upwards around the lower portion of the front portion of the vehicle. As this occurs, it is preferable that the front portion of the vehicle is shaped so that the inclination angle of the surface S of the front cover 221 that covers the front surface of the upper cross portion 51 relative to the horizontal plane is greater than an inclination angle of surfaces of the outer lenses of the front portion of the vehicle that are disposed directly above the headlamps 74, 75 relative to the horizontal plane.

As shown in FIG. 10B, an outline of a left portion of the front portion of the vehicle that appears in the plan view of the vehicle 1A is referred to as a left edge of the front portion of the vehicle. In addition, an outline of a right portion of the front portion of the vehicle that appears in the plan view of the vehicle 1A is referred to as a right edge of the front portion of the vehicle. The left edge and right edge of the vehicle 1A are defined by the outer lenses of the headlamps 74, 75 and the front cover 221.

The left edge of the front portion of the vehicle extends from the front end 100A to the left of a left end of the upper cross portion 51 in the plan view of the vehicle 1A. A left end 101A of the left edge of the front portion of the vehicle is disposed on the left of the left front wheel 31 (on the left of the additional line N). The left end 101A of the left edge of the front portion of the vehicle is disposed behind the lower cross portion 52. Further, the left end 101A of the left edge of the front portion of the vehicle is disposed behind the upper cross portion 51.

Similarly, the right edge of the front portion of the vehicle extends from the front end 100A to the right of a right end of the upper cross portion 51 in the plan view of the vehicle 1A. A right end 102A of the right edge of the front portion of the vehicle is disposed on the right of the right front wheel 32 (on the right of the additional line M). Additionally, the right end 102A of the right edge of the front portion of the vehicle is disposed behind the lower cross portion 52. Further, the right end 102A of the right edge of the front portion of the vehicle is disposed behind the upper cross portion 51.

In this manner, in the plan view of the vehicle 1A, the left and right edges of the front portion of the vehicle extend from the front end 100A that projects forward at the central portion of the front portion of the vehicle in the left-and-right direction to outward of left and right end portions of the upper cross portion 51. This allows the front portion of the vehicle to have a streamlined shape in the plan view of the vehicle 1A, so that the voluminous appearance of the front portion of the vehicle becomes small and hence the air resistance becomes small. In case the left and right end portions 101A, 102A of the front portion of the vehicle are disposed behind the upper cross portion 51, the angles defined by the left edge and the right edge and the travelling direction of the vehicle 1A are preferably small.

Additionally, in the front view of the vehicle 1A as shown in FIG. 9, a distance D1 from the front end 100A of the front portion of the vehicle to the upper end of the lower cross portion 52 is shorter than a vertical dimension D2 from the upper end of the lower cross portion 52 to an upper end portion of the windshield 229 that defines an upper end portion of the front portion of the vehicle. This configuration makes a lower portion of the front portion of the vehicle that projects forward small, thus making it possible to reduce the voluminous appearance of the front portion of the vehicle.

Additionally, in the plan view of the vehicle 1A as shown in FIG. 10B, the front end 100A is disposed between the outer lens of the left headlamp 74 and the outer lens of the right headlamp 75. This allows the center in the left-and-right direction to project forward, and therefore, the front portion of the vehicle has a streamlined shape in the plan view of the vehicle 1A, so that the voluminous appearance of the front portion of the vehicle is small.

In this preferred embodiment, at least a portion of a hydraulic unit 80 is disposed between the left headlamp 74 and the right headlamp 75 in the plan view of the vehicle 1A. As has been described before, the hydraulic unit 80 is heavy. Since the heavy hydraulic unit 80 is disposed at the center in the left-and-right direction, it is possible to provide the vehicle 1A with a good weight balance.

Also in the vehicle 1A according to this preferred embodiment, at least portions of the headlamps 74, 75 are disposed on the left of the right end of the right front wheel 32 and on the right of the left end of the left front wheel 31 when the vehicle 1A is in the upright state and is disposed above the upper ends of the right front wheel 32 and the left front wheel 31 and below the upper end of the lower cross portion 52 in relation to the up-and-down direction of the body frame 21 in the position located ahead of the front end of the lower cross portion 52 in the side view of the vehicle 1A.

In the front portion of the vehicle that includes the headlamps 74, 75 and the body cover 22, the front edge of the front portion of the vehicle extends from the front end to above the upper cross portion 51 and to behind the front end of the lower cross portion 52 in the side view of the vehicle 1A when the vehicle 1A is in the upright state. The front end 100 of the front portion of the vehicle is disposed on the left of the right end of the right front wheel 32 and on the right of the left end of the left front wheel 31 when the vehicle 1A is in the upright state and is disposed above the upper ends of the right front wheel 32 and the left front wheel 31 and below the upper end of the lower cross portion 52 in relation to the up-and-down direction of the body frame 21 in the position located ahead of the front end of the lower cross portion 52 in the side view of the vehicle 1A.

Also in the vehicle 1A according to this preferred embodiment, the front end 100A of the front portion of the vehicle is disposed in the area where at least portions of the headlamps 74, 75 are disposed and which is located above the upper ends of the right front wheel 32 and the left front wheel 31 and below the upper end of the lower cross portion 52.

In the vehicle 1A according to the present preferred embodiment, as has been described above, the headlamp area front edge portion of the front edge of the front portion of the vehicle is disposed in the area that is located lower and farther forward in the side view of the vehicle 1A. Further, since the front end 100A of the front portion of the vehicle is disposed at the headlamp area front edge portion or ahead thereof, the front end 100A of the front portion of the vehicle is disposed in the area that is located lower and farther forward. In particular, the front end 100A of the front portion of the vehicle is disposed in the position that is spaced apart a large distance forward and downward from the upper end of the front portion of the vehicle. Because of this, the front edge of the front portion of the vehicle has a smoothly continuous rectilinear or substantially rectilinear shape from the upper end to the front end 100A of the front portion of the vehicle.

Additionally, since the front end 100A of the front portion of the vehicle is disposed above the upper ends of the right front wheel 32 and the left front wheel 31, the front portion of the vehicle has a compact shape in the up-and-down direction, so that the voluminous appearance of the front portion of the vehicle is reduced. Further, the front end of the front portion of the vehicle is disposed above the upper ends of the right front wheel 32 and the left front wheel 31 and below the upper end of the lower cross portion 52 in relation to the up-and-down direction of the body frame 21 in the position that is located ahead of the front end of the lower cross portion 52. In particular, the front portion of the vehicle has a shape in which the front end 100A thereof projects to the front in a lower position (for example, a shell shape). Because of this, it is easy for the portion located near the eyes of the user who rides on the vehicle 1A to be small, so that the voluminous appearance is easily reduced.

For the reasons described heretofore, there is provided the vehicle 1A including the headlamps 74, 75 disposed in the interior of the body cover 22 in which the voluminous appearance of the front portion of the vehicle is small while reducing the air resistance.

In addition, in the vehicle 1A according to this preferred embodiment, as shown in FIG. 10A, the front edge of the front portion of the vehicle has the shape in which the inclination angle of the portion T that is disposed above the headlamp 71 relative to the horizontal line is smaller than the inclination angle of the portion S that is disposed above that portion relative to the horizontal plane in the side view of the vehicle 1A when the vehicle 1A is in the upright state.

On the front edge of the front portion of the vehicle, since the inclination angle of the portion T that is disposed above the headlamps 74, 75 relative to the horizontal plane is smaller than the inclination angle of the portion S that is disposed above the portion above the headlamps 74, 75 relative to the horizontal plane, the front edge of the front portion of the vehicle is easily shaped so as to project forward in the a position in the side view of the vehicle 1. This provides the vehicle 1A in which the voluminous appearance of the front portion of the vehicle is reduced and that reduces the air resistance further.

Additionally, in the vehicle 1A according to this preferred embodiment, in the front view of the vehicle 1A when the vehicle 1A is in the upright state as shown in FIG. 9, the vertical distance D1 from the front end 100A of the front portion of the vehicle to the upper end of the lower cross portion 52 is shorter than the vertical dimension D2 from the upper end of the lower cross portion 52 to the upper end portion of the front portion of the vehicle.

The portion T from the front end 100A of the front portion of the vehicle to the upper end of the lower cross portion 52 is disposed below the portion S from the upper end of the lower cross portion 52 to the upper end of the front portion of the vehicle in relation to the up-and-down direction. Since the portion T from the front end 100A of the front portion of the vehicle to the upper end of the lower cross portion 52 that is disposed at the lower portion of the front portion of the vehicle is small in the vertical direction, the portion of the front portion of the vehicle that projects forward is small in size, so that the voluminous appearance of the front portion of the vehicle is reduced.

In addition, in relation to the vehicle 1A according to this preferred embodiment, as shown in FIG. 10B, the vehicle 1A includes the right headlamp 75 that includes the outer lens defining a portion of the right edge of the front portion of the vehicle and the left headlamp 74 that includes the outer lens defining a portion of the left edge of the front portion of the vehicle. The front end 100A of the front portion of the vehicle is disposed between the outer lens of the right headlamp 75 and the outer lens of the left headlamp 74 in the plan view of the vehicle 1A.

Also in the plan view of the vehicle 1A, the front portion of the vehicle has the shape in which the front end 100A thereof projects ahead of the right end 102A and the left end 101A of the front portion of the vehicle, so that the voluminous appearance of the front portion of the vehicle is reduced while reducing the air resistance.

Additionally, the vehicle 1A according to the present preferred embodiment includes the brake device that applies a braking force to at least one of the right front wheel 32 and the left front wheel 31 and the fluid unit 80 that includes a plurality of flow paths to control the operation of the brake device by switching the flow paths through which a brake fluid flows. At least a portion of the hydraulic unit 80 is disposed between the right headlamp 75 and the left headlamp 74 in the plan view of the vehicle 1A when the vehicle 1A is in the upright state.

In relation to the fluid unit 80, the right headlamp 75 and the left headlamp 74 which are all the heavy devices, since at least a portion of the fluid unit 80 is disposed between the right headlamp 75 and the left headlamp 74, the weight of the front portion of the vehicle is easily balanced in relation to the left-and-right direction.

Thus, while the present invention has been described heretofore with reference to the first preferred embodiment and the second preferred embodiment thereof, the technical scope of the present invention is not limited to the technical scopes that are descriptively defined in the preferred embodiments. Various alterations, combinations, substitutions, or improvements to the preferred embodiments of the present invention are possible and are within the scope of the present invention.

The preferred embodiments described heretofore are intended to facilitate the understanding of the present invention and are not intended to limit the present invention. The preferred embodiments of the present invention can be modified or improved without departing from the scope thereof and that their equivalents can be also included in the present invention.

The terms and expressions that are used in this description are used to describe the preferred embodiments of the present invention and hence should not be construed as limiting the scope of the present invention. It should be understood that any equivalents to the characteristic matters that are shown and described in this description should not be excluded and that various modifications made within the scope of claims to be made later are permitted.

Other Modified Examples

For example, in the first and second preferred embodiments that have been described above, while the front mud guards preferably do not define a front portion of the vehicle, in a vehicle in which front mud guards are integral with a front cover, a front portion of the vehicle is configured so as to include the front mud guards. Additionally, in the first and second preferred embodiments, the vehicles 1, 1A preferably include the windshield 229, but the present invention can also be applied to a vehicle that includes no windshield 229.

In the preferred embodiments described above, while the front end portion of the front cover 221 preferably defines the front end of the front portion of the vehicle, the present invention is not limited thereto. For example, front ends of the headlamps 74, 75 may define the front end of the front portion of the vehicle.

Additionally, the present invention can also be applied to a vehicle that includes two headlamps that are aligned in a vertical direction. As this occurs, in case the present invention is applied to a construction in which the two headlamps that are aligned in the vertical direction are disposed at a center in the left-and-right direction, it is possible to provide a vehicle in which the voluminous appearance of a front portion of the vehicle is small and hence the resistance of the vehicle is small as described in the first preferred embodiment.

In addition, the present invention can also be applied to a vehicle that includes three headlamps. As this occurs, the first preferred embodiment and the second preferred embodiment are combined together so that one headlamp is disposed at the center in the left-and-right direction as done in the first preferred embodiment and two headlamps is disposed on left and right sides of the central headlamp as done in the second preferred embodiment.

Additionally, the present invention can also be applied to a vehicle that includes four or more headlamps and the voluminous appearance of a front portion of the vehicle and the air resistance of the vehicle is small by combining the first preferred embodiment and the second preferred embodiment.

An LED (Light Emitting Diode) element, a filament bulb, a discharge bulb, a laser light source or a surface emitting panel light source (for example, an EL element) may be used as a light source contained in the headlamp.

An outer lens including a lens element that refracts light may be used as the outer cover of the headlamp as done in the preferred embodiments described above, or the outer cover may be a transparent outer cover that transmits light with no reflection or refraction.

In the preferred embodiments of the present invention, the acute angles preferably are angles that include 0° and that are smaller than 90°. Originally, the acute angles do not include 0°, but in the preferred embodiments of the present invention, it is understood that the acute angles include 0°. In the preferred embodiments of the present invention, the imaginary plane that intersects perpendicular or substantially perpendicularly the upper axes and the lower axes of the cross members is a plane that extends rearwards and upwards. However, the present invention is not limited thereto, and hence, the imaginary plane that intersects perpendicular or substantially perpendicularly the upper axes and the lower axes of the cross members may be a plane that extends forward and upwards.

When referred to in this description, "parallel" also includes two straight lines that do not intersect each other as members while they are inclined within the range of ±40°. When used together with a "direction" and a "member" in the description of preferred embodiments of the present invention, "along" also includes a case where what follows the direction and the member is inclined relative thereto within the range of ±40°. When used together with a "direction" in this description, "extend" also includes a case where what extends is inclined relative to the direction within the range of ±40°.

The vehicle 1 according to various preferred embodiments of the present invention is the vehicle 1 including the body frame which leans and the two front wheels. The number of rear wheels may be one or more. The vehicle may include a body cover that covers the body frame. The vehicle may not include the body cover which covers the body frame. The power unit includes the power source. The power source is not limited to the engine and hence may be an electric motor.

In a preferred embodiment described above, the center of the rear wheel 4 in relation to the left-and-right direction of the body frame 21 preferably coincides with the center of the distance defined between the left front wheel 31 and the right front wheel 32 in relation to the left-and-right direction of the body frame 21. Although the configuration described above is preferable, the center of the rear wheel 4 in relation to the left-and-right direction of the body frame 21 may not coincide with the center of the distance defined between the left front wheel 31 and the right front wheel 32 in relation to the left-and-right direction of the body frame 21.

In a preferred embodiment described above, the right side portion 54, the left side portion 53, and the headstock 211 are preferably provided in positions that are superposed one on another in the side view of the body frame 21. However, in the side view of the body frame 21, the headstock 211 may be provided in a different position from the positions where the right side portion 53 and the left side portion 54 are provided in relation to the front-and-rear direction. Additionally, angles at which the right side portion 54 and the left side portion 53 lean from the up-and-down direction of the body frame 21 may differ from an angle at which the headstock 211 leans.

The link support portion (the headstock) may include a single structural element or a plurality of structural elements. In the case of the headstock including a plurality of structural elements, the structural elements may be joined together through welding, bonding or the like. Alternatively, the structural elements may be joined together with fastening members such as bolts, rivets or the like.

In a preferred embodiment described above, while the headstock 211 is preferably a portion of the body frame 21 that supports the steering shaft 60 so as to turn, the present invention is not limited thereto. A member may be used which supports the steering shaft 60 so as to turn about a middle steering axis Y3 in place of the headstock. For example, a member may be used which includes a bearing which supports the steering shaft 60 so as to turn about the middle steering axis Y3.

In various preferred embodiments of the present invention, the body frame preferably includes the headstock, the connecting member (the upper front-and-rear or longitudinal frame portion), the down frame (the up-and-down or vertical frame portion) and the under frame (the lower front-and-rear or longitudinal frame portion), and they are connected together through welding. However, the body frame of the present invention is not limited to the preferred embodiments described above. The body frame may preferably include the headstock, the upper longitudinal frame portion, the vertical frame portion, and the lower longitudinal frame portion. For example, the body frame may be integral entirely or partially through casting or the like. Additionally, in the body frame, the upper longitudinal frame portion and the vertical frame portion may include one member or separate members.

In the preferred embodiments described above, the left shock absorber 33 and the right shock absorber 34 preferably each include the pair of telescopic mechanisms. However, depending upon the specification of the vehicle 1, the number of telescopic mechanisms that the left shock absorber 33 and the right shock absorber 34 include individually may be one.

In a preferred embodiments described above, the acute angle defined by the turning axis of the steering shaft and the up-and-down direction of the body frame coincides with the acute angle defined by the direction in which the right shock absorber and the left shock absorber extend or contract and the up-and-down direction of the body frame. However, the present invention is not limited to the preferred embodiments described above. For example, the acute angle defined by the turning axis of the steering shaft and the up-and-down direction of the body frame may be smaller or greater than the acute angle defined by the direction in which the right shock absorber and the left shock absorber extend or contract and the up-and-down direction of the body frame.

In addition, in the preferred embodiments described above, the turning axis of the steering shaft and the direction in which the right shock absorber and the left shock absorber extend and contact preferably coincide with each other. However, the present invention is not limited to the preferred embodiments described above. In a side view of the vehicle being in the upright state, the turning axis of the steering shaft and the direction in which the right shock absorber and the left shock absorber extend or contact may be spaced away from each other in the front-and-rear direction. Alternatively, they may intersect each other.

In a preferred embodiment described above, the right front wheel and the left front wheel preferably are supported so that their upper ends move farther upwards in the up-and-down direction of the body frame than an upper end of the down frame of the body frame. However, the present invention is not limited to the preferred embodiments described above. In the present invention, the right front wheel and the left front wheel may be able to move upwards as high as or to a height that is lower than the upper end of the down frame of the body frame in the up-and-down direction of the body frame.

The upper cross portion may include an upper front cross portion that includes a single portion, an upper rear cross portion that includes a single portion, and a connecting member that is provided between the upper and lower cross portions and that includes a plurality of portions. In the event of the headstock 211 includes the plurality of components, the components may be fastened together through welding or bonding or may be fastened together with a fastening member such as a bolt or a rivet.

The lower cross portion may include a lower front cross portion that includes a single portion, a lower rear cross portion that includes a single portion, and a connecting member that is provided between the lower front and rear cross portions and that includes a plurality of portions. In the event of the headstock 211 includes the plurality of components, the components may be fastened together through welding or bonding or may be fastened together with a fastening member such as a bolt or a rivet.

The right side portion and the left side portion may each include a single portion or a plurality of portion. In the event of the headstock 211 includes the plurality of components, the components may be fastened together through welding or bonding or may be fastened together with a fastening member such as a bolt or a rivet. The right side portion and the left side portion may each include a portion that is disposed ahead of the upper cross portion or the lower cross portion in the front-and-rear direction of the body frame and a portion that is disposed behind the upper cross portion or the lower cross portion in the front-and-rear direction of the body frame. The upper cross portion or the lower cross portion may be disposed between the portions that are disposed ahead of the right side portion and the left side portion and the portions that are disposed behind the right side portion and the left side portion.

In a preferred embodiment of the present invention, the link mechanism may include further a cross portion in addition to the upper cross portion and the lower cross portion. The upper cross portion and the lower cross portion are so called only from their relative positional relationship in the up-and-down direction. The upper cross portion does not imply an uppermost cross portion in the link mechanism. The upper cross portion means a cross portion that is located above a cross portion that is located therebelow. The lower cross portion does not imply a lowermost cross portion in the link mechanism. The lower cross portion means a cross portion that is located below a cross portion that is located thereabove. Additionally, the cross portion may include two portions of a right cross portion and a left cross portion. In this manner, the upper cross portion and the lower cross portion may each include a plurality of cross portions as long as they still exhibit the link function. Further, other cross portions may be provided between the upper cross portion and the lower cross portion. The link mechanism should include the upper cross portion and the lower cross portion.

The present invention can be implemented with many different preferred embodiments. This disclosure should be understood to provide a description of principle preferred embodiments of the present invention. Based on the understanding that there is no intention to limit the present invention to the preferred embodiments that is described and/or illustrated herein, the preferred embodiments are described and illustrated herein.

The illustrated preferred embodiments of the present invention are described herein. The present invention is not limited to the preferred embodiments described herein. The present invention also includes every preferred embodiment which includes equivalent elements, modifications, deletions, combinations (for example, a combination of characteristics from various preferred embodiments), improvements and/or alternations which those skilled in the art to which the present invention pertains can recognize based on the disclosure made herein. The limitative matters of claims should be construed broadly based on terms used in the claims and hence should not be limited by the preferred embodiments described in this specification or the prosecution of this patent application. Those preferred embodiments should be construed as non-exclusive. For example, in this disclosure, such terms as "preferable or preferably" and "may be or do" are non-exclusive terms and mean that "it is preferable, but the present invention is not limited thereto" and "it may be or do, but the present invention is not limited thereto," respectively.

The contents of the Japanese Patent Application No. 2013-138488 filed on Jul. 1, 2013 are incorporated herein by reference in their entirety and constitute part of the description of this patent application. Namely, the following configurations also constitute part of the description of the patent application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:
1. A vehicle comprising:
a body frame that leans to a right of the vehicle when the vehicle turns right and that leans to a left of the vehicle when the vehicle turns left;
a right front wheel and a left front wheel that are aligned in a left-and-right direction of the body frame;
a right suspension device that supports the right front wheel at a lower portion thereof and that absorbs an upward displacement of the right front wheel in an up-and-down direction of the body frame;
a left suspension device that supports the left front wheel at a lower portion thereof and that absorbs an upward displacement of the left front wheel in the up-and-down direction of the body frame;
a link mechanism which includes:
a right side portion that supports an upper portion of the right suspension device so as to allow the upper portion of the right suspension device to turn about a right steering axis that extends in the up-and-down direction of the body frame;
a left side portion that supports an upper portion of the left suspension device so as to allow the upper portion of the left suspension device to turn about a left steering axis that is parallel or substantially parallel to the right steering axis;
an upper cross portion that supports an upper portion of the right side portion at a right end portion thereof so as to allow the upper portion of the right side portion to turn about an upper right axis that extends in a front-and-rear direction of the body frame and supports an upper portion of the left side portion at a left end portion thereof so as to allow the upper portion of the left side portion to turn about an upper left axis that is parallel or substantially parallel to the upper right axis and that is supported on the body frame at a middle portion thereof so as to turn about an upper middle axis that is parallel or substantially parallel to the upper right axis and the upper left axis; and
a lower cross portion that supports a lower portion of the right side portion at a right end portion so as to allow the upper portion to turn about a lower right axis that is parallel or substantially parallel to the upper right axis and supports a lower portion of the left side portion at a left end portion thereof so as to allow the upper portion to turn about a lower left axis that is parallel or substantially parallel the upper left axis and that is supported on the body frame at a middle portion thereof so as to turn about a lower middle axis that is parallel or substantially parallel to the upper middle axis;
a headlamp including a light source that emits light to a front of the vehicle; and
a body cover that covers at least a portion of the headlamp, the upper cross portion, and a right side surface, a left side surface, and an upper surface of the lower cross portion; wherein
at least a portion of the headlamp is disposed on the left of a right end of the right front wheel and on the right of a left end of the left front wheel when the vehicle is in an upright state, above upper ends of the right front wheel and the left front wheel, below an upper end of the lower cross portion in relation to the up-and-down direction of the body frame in a position located ahead of a front end of the lower cross portion in a side view of the vehicle;

in a front end portion of the vehicle that includes the headlamp and the body cover:
- a front edge of the front portion of the vehicle extends from a front end to above the upper cross portion and to behind the front end of the lower cross portion in the side view of the vehicle when the vehicle is in the upright state; and
- the front end of the front portion of the vehicle is disposed on the left of the right end of the right front wheel and on the right of the left end of the left front wheel when the vehicle is in the upright state, above the upper ends of the right front wheel and the left front wheel, and below the upper end of the lower cross portion in relation to the up-and-down direction of the body frame in a position located ahead of the front end of the lower cross portion in the side view of the vehicle.

2. The vehicle according to claim 1, wherein a right end and a left end of the front portion of the vehicle are disposed behind the front end of the lower cross portion in a top view of the vehicle when the vehicle is in the upright state.

3. The vehicle according to claim 2, wherein the right end and the left end of the front portion of the vehicle are disposed behind a front end of the upper cross portion in the top view of the vehicle when the vehicle is in the upright state.

4. The vehicle according to claim 3, wherein the right end and the left end of the front portion of the vehicle are disposed behind a rear end of the lower cross portion in the top view of the vehicle when the vehicle is in the upright state.

5. The vehicle according to claim 4, wherein the right end and the left end of the front portion of the vehicle are disposed behind a rear end of the upper cross portion in the top view of the vehicle when the vehicle is in the upright state.

6. The vehicle according to claim 1, wherein the front end of the front portion of the vehicle is disposed behind front ends of the right front wheel and the left front wheel in the side view of the vehicle when the vehicle is in the upright state.

7. The vehicle according to claim 1, wherein at least a portion of the headlamp is disposed above a lower end of the lower cross portion in relation to the up-and-down direction of the body frame in the side view of the vehicle when the vehicle is in the upright state.

8. The vehicle according to claim 1, wherein at least a portion of the headlamp is disposed ahead of rotating axes of the right front wheel and the left front wheel in the side view of the vehicle when the vehicle is in the upright state.

9. The vehicle according to claim 1, wherein at least a portion of an outer cover that covers the light source of the headlamp defines a portion of the front edge of the front portion of the vehicle in the side view of the vehicle.

10. The vehicle according to claim 1, wherein the front portion of the vehicle has a shape in which the front portion of the vehicle is tapered from the right end and the left end thereof towards the headlamp in the top view of the vehicle.

11. The vehicle according to claim 1, further comprising a brake device that applies a braking force to at least one of the right front wheel and the left front wheel; and
a fluid unit including a plurality of brake fluid flow paths to control an operation of the brake device by switching the flow paths through which a brake fluid flows; wherein
at least a portion of the fluid unit is aligned with the headlamp along a vertical direction when the vehicle is in the upright state.

12. The vehicle according to claim 11, wherein at least a portion of the fluid unit is disposed between the headlamp and the upper cross portion in a front view of the vehicle when the vehicle is in the upright state.

13. The vehicle according to claim 1, wherein the front edge of the front portion of the vehicle is shaped so that an inclination angle of a portion that is disposed above the headlamp relative to a horizontal plane is smaller than an inclination angle of a portion that is disposed above the portion above the headlamp relative to the horizontal plane in the side view of the vehicle when the vehicle is in the upright state.

14. The vehicle according to claim 13, wherein a vertical distance from the front end of the front portion of the vehicle to the upper end of the lower cross portion is smaller than a vertical distance from the upper end of the lower cross portion to the upper end of the front portion of the vehicle in a front view of the vehicle when the vehicle is in the upright state.

15. The vehicle according to claim 1, wherein the headlamp includes a right headlamp including an outer cover that defines a portion of a right edge of the front portion of the vehicle and a left headlamp including an outer cover that defines a portion of a left edge of the front portion of the vehicle; and
the front end of the front portion of the vehicle is disposed between the outer cover of the right headlamp and the outer cover of the left headlamp in the top view of the vehicle.

16. The vehicle according to claim 15, further comprising:
a brake device that applies a braking force to at least one of the right front wheel and the left front wheel; and
a fluid unit including a plurality of brake fluid flow paths to control an operation of the brake device by switching the flow paths through which a brake fluid flows; wherein
at least a portion of the fluid unit is disposed between the right headlamp and the left headlamp in the top view of the vehicle when the vehicle is in the upright state.

* * * * *